(12) United States Patent
Ishida et al.

(10) Patent No.: US 6,604,048 B2
(45) Date of Patent: Aug. 5, 2003

(54) CAR NAVIGATION SYSTEM AND STORAGE MEDIUM

(75) Inventors: Akira Ishida, Okazaki (JP); Shinichi Kato, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/923,335

(22) Filed: Aug. 8, 2001

(65) Prior Publication Data

US 2002/0019700 A1 Feb. 14, 2002

(30) Foreign Application Priority Data

Aug. 9, 2000 (JP) .................................. 2000-241905
Sep. 14, 2000 (JP) .................................. 2000-279701

(51) Int. Cl.⁷ ................................................ G01S 3/02
(52) U.S. Cl. ................................. 701/213; 342/357.08
(58) Field of Search .......................... 701/208, 210, 701/211, 213; 340/995; 342/357.08, 357.13

(56) References Cited

U.S. PATENT DOCUMENTS 5,899,953 A * 5/1999 Urahashi .................... 701/117
6,259,989 B1 * 7/2001 Kusama ..................... 701/208
6,385,540 B1 * 5/2002 Ajima ........................ 701/213

FOREIGN PATENT DOCUMENTS

| JP | A 2-137096 | 5/1990 |
| JP | A 3-154818 | 7/1991 |
| JP | A 10-141968 | 5/1998 |
| JP | A-11-23299 | 1/1999 |
| JP | B1 3027574 | 1/2000 |

* cited by examiner

Primary Examiner—Michael J. Zanelli
(74) Attorney, Agent, or Firm—Oliff & Berridge, PLC

(57) ABSTRACT

A vehicle navigation system and storage medium for determining an estimated position of a vehicle. The system and storage medium comprises at least an input unit, a present position detection unit, a storage unit, a central processing unit, an information transmission/reception unit and an output unit. Information concerning route guidance is input, as is present position detected information, and stored such that calculation of an estimated position of a vehicle may be generated based on a variety of conditions such as vehicle speed history, elevation angle of a satellite position relative to the vehicle, and penalty values attributed to the types of roads traveled.

12 Claims, 20 Drawing Sheets

[H-1] CHANGE IN GPS AND VEHICLE SPEED NEAR THE ACCESS TO EXPRESSWAY

GAIN TABLE (a)

| GAIN OF EXPRESSWAY | + POSITIVE GAIN<br>GAIN (MAX 50) |
|---|---|
| [H-1] CHANGE IN GPS AND VEHICLE SPEED NEAR THE ACCESS ROAD TO EXPRESSWAY | 20 |
| [H-2] HISTORY OF VEHICLE SPEED | 10 |
| [H-3] VARIATION OF NUMBER OF GPS RECEPTION | 10 |
| [H-4] ELECTRIC WAVE BEACON RECEPTION | 10 |

(b)

| GAIN OF ORDINARY ROAD | - NEGATIVE GAIN<br>GAIN (MAX 50) |
|---|---|
| [G-1] CHANGE IN GPS AND VEHICLE SPEED NEAR THE ACCESS ROAD TO THE EXPRESSWAY | 10 |
| [G-2] OPTICAL BEACON RECEPTION | 40 |

MAXIMUM VALUE OF PENALTY TO BE REFLECTED ON MAP MATCHING  100

FIG. 17

CAR NAVIGATION SYSTEM AND STORAGE MEDIUM

BACKGROUND OF THE INVENTION

1. Field of Invention

The present invention relates to a car-navigation system and storage medium for determining an estimated position of a vehicle.

2. Description of Related Art

Conventionally, various methods have been proposed for judging whether a road where a vehicle is traveling is an expressway (expressway, metropolitan express, toll road, or the like) or other ordinary road. For example, a method, has been proposed (Japanese Patent Application No. HEI 3-154818) for judging that a vehicle may have passed a toll road if the vehicle speed is equal to or less than a predetermined value at the position of a toll gate obtained from map information, estimating the correlation of the vehicle with the toll road higher than that correlation with other roads and, thereupon, correcting the present position of the vehicle through the selection of a road, judging that there is little possibility the vehicle has passed a toll road if the vehicle speed does not lower to a predetermined value or less, estimating the correlation of the vehicle with the toll road lower than the correlation with the other roads, and thereupon, correcting the present position of the vehicle through the selection of a road.

On the other hand, a method has been proposed (Japanese Patent Application No. HEI 2-137096) in which timekeeping is started when a vehicle speed is determined to be equal to or higher than a predetermined speed, and it is determined that the vehicle is traveling on an expressway if the time is equal to or more than a predetermined time. In short, a vehicle is determined to be traveling on an expressway when a traveling speed equal to or higher than a predetermined speed has been sustained for a predetermined time or longer.

In addition, a method has been proposed (Japanese Patent No. 3027574) for distinguishing the upper layer where the ratio of sections that are GPS positioned in a certain sectional distance is equal to or more than a certain upper layer distinction threshold, for the travel of one's vehicle on a multilayer road, and distinguishing the lower layer in case where the ratio is equal to or less than a certain lower layer distinction threshold.

Moreover, a method for receiving an electric wave from the GPS satellite, and distinguishing a road to be an ordinary road if the angle of elevation of the GPS satellite is equal to or less than a predetermined angle, and an upper layer of an elevated road if the angle of elevation of the GPS satellite is greater than the predetermined angle, has been proposed (Japanese Patent Application No. HEI 10-141968).

In the method for distinguishing whether the vehicle has passed a toll road or not according to whether the vehicle speed at the position of a toll gate is equal to or less than a predetermined value, the vehicle speed may happen to be equal to or less than the predetermined value even when the vehicle is traveling on an ordinary road, particularly where a traffic light is red, because there are places where traffic lights exist near the toll gate given the actual traffic situation. In such places, the road on which a vehicle is traveling can not be judged by the toll gate and the vehicle speed.

In the method wherein the vehicle is judged to be traveling on an expressway if it is distinguished that the time for traveling at or more than the predetermined speed is equal to or more than the predetermined time, it is impossible to judge whether a vehicle is traveling on an expressway or not simply by the vehicle speed, because there are cases where the vehicle speed is considerably high even on ordinary, i.e., non-expressway, roads if such an ordinary road is, for example, a main arterial road, permitting a high vehicle speed limit or an expressway feeder road also having a high speed limit.

In the method for distinguishing the upper layer from the lower layer of a multi-layer road by the ratio of sections that are GPS positioned for traveling on the multilayer road, it is impossible to judge whether the vehicle is traveling on an upper layer or not simply from the GPS positioning state, because there are cases where structures, such as a building or the like existing around the road, block the GPS electric wave rendering the GPS positioning ineffective in these places.

Further, in the method for distinguishing an ordinary road from an upper layer of an elevated road depending on whether the angle of elevation of the received GPS satellite is equal to or less than a predetermined angle, places exist where there is no upper layer portion of the elevated road over the ordinary road for some lanes, and electric wave signals from the GPS satellite are not blocked. In such places, it is impossible to distinguish the upper layer from the lower layer of the elevated road based on the angle of elevation of the GPS satellite signal.

SUMMARY OF THE INVENTION

The invention has been devised to solve the aforementioned problems, and it is an object of the invention to determine the estimated position of a vehicle accurately even under various situations.

The invention provides a car-navigation system for determining the estimated position of a vehicle, characterized by comprising reception means for receiving electric wave signals from a plurality of positioning satellites, vehicle speed detection means for detecting the speed of a vehicle, storage means for storing at least received positioning satellite information and detected vehicle speed information, and control means for judging whether the vehicle has passed a tollgate based on the positioning satellite information and the vehicle speed information stored in the storage means.

The invention also provides a car-navigation system for judging the upper and lower roads of a multilayer road, characterized in that comparison coefficients are allocated to a plurality of judgment conditions, and the upper and lower roads of the multilayer road is judged based on the sum of comparison coefficients.

The invention also provides a car-navigation system for determining the estimated position of a vehicle, characterized by comprising reception means for receiving electric wave signals from a plurality of positioning satellites, and control means for allocating comparison coefficients based on an angle of elevation of the received satellite, and judging the estimated position of a vehicle based on the sum of the comparison coefficients.

The invention further provides a car-navigation system for determining the estimated position of a vehicle, characterized by comprising a first judgment means for judging whether the expressway is predominant as the estimated position, a second judgment means for judging whether the ordinary road is predominant as the estimated position, and control means for determining the vehicle estimated position based on the judgment results of the first and second judgment means.

Further still, the present invention provides a storage medium having a built-in program for determining an estimated position of a vehicle, characterized by comprising a first judgment for judging whether the expressway is predominant as the estimated position, a second judgment for judging whether the ordinary road is predominant as the estimated position, and a built-in program for determining the vehicle estimated position based on the judgment results of the first and second judgments.

BRIEF DESCRIPTION OF THE DRAWINGS

FIG. 2 shows an example of road data;

FIG. 17 illustrates a gain table;

DETAILED DESCRIPTION OF PREFERRED EMBODIMENTS

Now, the exemplary embodiments of the invention will be described.

Figures 1, 2A, 2B, 2C:
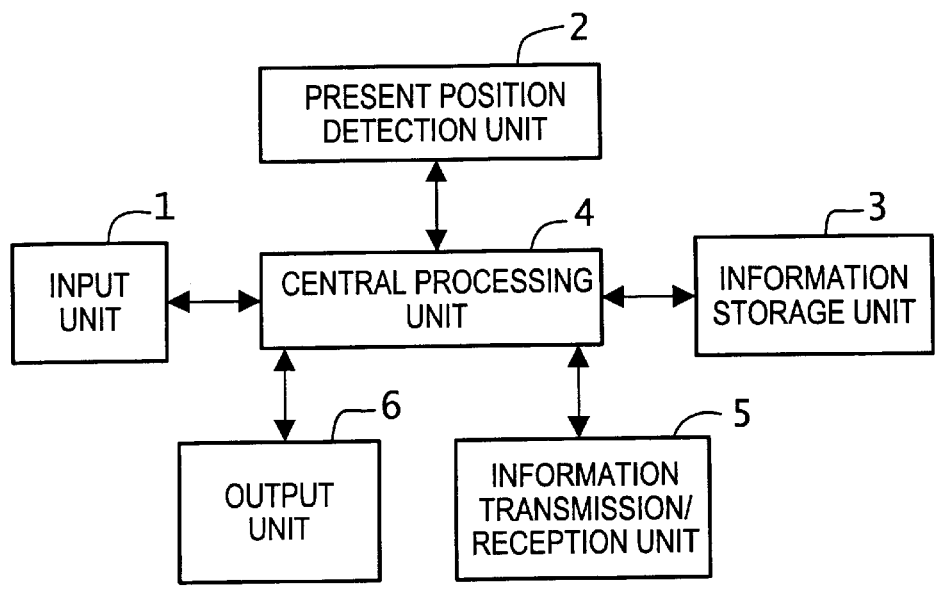
FIG. 1 is a diagram showing an exemplary embodiment of the navigation system of the invention.

FIG. 1 is a diagram showing an example of the car navigation system for a vehicle according to the invention. It includes an input unit 1 for inputting information concerning route guidance, a present position detection unit 2 for detecting information concerning the present position of a vehicle, an information storage unit 3 having recorded therein data for navigation necessary for calculation of the route, display/voice guidance data necessary for the route guidance, and programs (applications and/or OS) or the like, a central processing unit 4 for performing route search processing, generation of data necessary for the route guidance, display/voice guidance processing necessary for the route guidance, and control of the entire system, an information transmission/reception unit 5 for transmitting and receiving information concerning the traveling of the vehicle, for example, road information or traffic information, for detecting information concerning the present position of the vehicle, and for transmitting and receiving information concerning the present position, and an output unit 6 for outputting information concerning the route guidance.

The input unit 1 has a function to input a destination, or to indicate a navigation processing to the central processing unit 4 depending on the will of the driver. Remote controllers, or the like, such as a touch switch, jog dial, or the like, for inputting the destination with a telephone number or coordinates on the map, or for requesting the route guidance, can be employed in order to realize this function. In addition, the invention comprises a unit for dialogue by voice input, that functions as a voice input unit. It is also possible to add a record card reader for reading out data recorded in an IC card or a magnetic card. Further, a data communication apparatus for exchanging data with information sources, such as an information center accumulating data necessary for navigation, and for supplying data through the communication line on the demand of the driver, a portable type electronic apparatus having data including map data, destination data, simplified map, building configuration map or the like, can also be added.

The present position detection unit 2 includes a GPS reception unit for calculating the present position, travel speed, absolute orientation or the like of the vehicle using the global positioning system (GPS). A beacon reception unit for receiving information such as present position information, lane information or the like, a data reception unit for receiving a correction signal of the GPS using a cellular phone (car telephone), an FM multiple signal or the like, an absolute orientation sensor for detecting the direction of travel of the vehicle in absolute orientation using, for example, terrestrial magnetism, a relative orientation sensor for detecting the direction of travel of the vehicle in relative orientation using, for example, a steering sensor or gyro sensor, a distance sensor for detecting the distance of travel from revolutions of wheels, or the like may be used to comprise the present position detector unit 2 and the GPS reception unit.

The information storage unit 3 is a storage unit storing programs and data for navigation, and includes an external storage device, for example, a CD-ROM, a DVD-ROM, a floppy disk, a memory card or the like. The information storage unit 3 may be an internal storage device such as a ROM or flash memory in the main unit. Programs include a program for performing processing such as route search, a program for performing an interactive guidance by voice input, a program for controlling display/voice output necessary for the route guidance, a program for searching for a spot or establishment, or the like. Recorded data include files of map data, search data, destination data, registered spot data, road data, image data of junctions such as intersections, genre data, landmark data or the like, and stores all data necessary for a navigation system. Here, the present invention can also be applied to those that store only data in the CD-ROM, and store programs in the central processing unit, or those that obtain data and programs from the outside by communication, or the like.

The central processing unit 4 includes a CPU for performing various calculation processings, a flash memory for reading in and storing programs from the CD-ROM of the information storage unit 3, a ROM storing programs (program read-in means) for program check and update processing of the flash memory, and a RAM for storing temporarily retrieved route guidance information such as spot coordinates of the set destination, road name code No. or the like, and data in calculation processing. The RAM includes a SRAM capable of retaining information even when the power is cut, and a DRAM that loses information when the power is cut. In addition, though not illustrated, a voice processor for performing the interactive processing through voice input from the input unit 1 and for synthesizing voice, phrase, sentences put together, sound or the like and converting into analog signal to output through a speaker, a communication interface for exchanging input/output data through communication, a sensor input interface for taking in a sensor signal from the present position detection unit 2, a clock for entering date or time in an internal dialog information, and the like are also provided. Here, programs for performing the update processing may be stored in an external storage device.

Programs according to the invention, or other programs for executing the navigation may all be stored in a CD-ROM as external storage medium, or a part of, or all of these programs may be stored in the main unit side ROM 42. Various navigation functions are realized, by inputting data and programs stored in this external storage medium into the central processing unit of the navigation apparatus main unit as external signals and by calculation processing of the same.

The navigation system of the invention has a relatively large capacity flash memory for reading in programs from the CD-ROM as an external storage device, and a small capacity ROM storing programs (program read-in means) for starting-up processing of the CD, built in as mentioned above. The flash memory is a non-volatile storage means, that can retain stored information even when the power is cut. As CD starting-up processing is performed, a program of ROM which is a program read-in means is started to perform the program check stored in the flash memory, for reading in disk management information or the like of the CD-ROM of the information storage unit 3. The program loading processing (update processing) is performed judging from this information and the state of the flash memory.

The information transmission/reception unit 5 includes a GPS reception unit for getting information employing the global navigation system (GPS), a VICS information reception unit employing FM multiple broadcasting, an electric wave beacon, an optical beacon or the like, a data transmission/reception unit for bilateral communication with an information center (for example, ATIS) and other vehicles employing a cellular phone, a personal computer or the like.

The output unit 6 is provided with functions to output guidance information through voice and/or display when required by the driver, and to print out data that is navigation processed by the central processing unit 4. As means for the same, a display for displaying input data on the screen, or for displaying the route guidance screen, a printer for printing out data processed by the central processing unit 4 and data stored in the information storage unit 3, a speaker for outputting the route guidance by voice, and the like may be provided to comprise the output unit 6.

The display includes a simplified type liquid crystal display or the like, and displays a road map screen processed by the central processing unit 4, an intersection enlarged view screen based on the map data or guidance data, a destination name, time, distance, arrows indicating the direction of travel, and the like. The communication line used for serial communication or the like can be employed, without passing through a specialized image signal line, by sending image data as bit map data to the display, or a communication line common with other equipment can also be employed. Here, the display may also include a memory for retaining the bit map data temporarily.

This display is installed in an instrument panel near the driver's seat, and the driver can confirm the present position of his/her vehicle, and obtain information about the future route. Though not shown, the display may also be composed to allow input of a location spot, a road or the like by touching or tracing the display screen using a tablet where the display screen is a touch panel, a touch screen or the like.

Now, the flow of the entire system will be described. When program from the information storage unit 3 is read in the central processing unit 4 and the program of the route guidance is started, the vehicle position is estimated based on output information of the present position detection unit 2 and the road information of the information storage unit 3. Next, the periphery map around the estimated position is displayed and, at the same time, the designation or the like of the estimated position is displayed. Then, the destination is set using the destination name such as name of a place, name of an establishment or the like, telephone number or address, registered spot, name of a road, or the like, and the route search from the estimated position to the destination is performed. Upon determination of the route, the route guidance/display are repeated while tracing the estimated positions until arrival at the destination. In case when a side trip setting is input before arriving at the destination, the search area is set for searching again in this search area, and similarly, the route guidance is repeated until arrival at the destination.

FIG. 2 shows an example of exemplary data files stored in the information storage unit 3 of the invention shown in FIG. 1. FIG. 2(A) shows a guidance road data file storing data necessary for calculating the route by the route calculation means and performing the route guidance, which includes the respective data of road number, length, road attribute data, address and size of configuration data, and address and size of guidance data, for the respective number of road n. The road number is set per direction (outward and homeward journeys) for each road between junctions. The road attribute data, as road guidance auxiliary information data, is data showing information on whether the concerned road is elevated, at the side of an elevated road, an underground road, or at the side of an underground road, and the number of lanes in a road. The configuration data includes coordinates data composed of east longitude and north latitude for the respective number of nodes m, when each road is divided by a plurality of nodes (segments). As shown in FIG. 2(B), the guidance data includes the respective data on name of intersection (or junction), critical point data, road name data, address and size of road name sound data, and address and size of destination data. The critical point data is data showing whether or not there is a crossing, a tunnel entrance, a tunnel exit, a road width reducing point, or the like, for attracting the attention of the driver at a crossing, tunnel, or the like, other than the junctions.

The road name data is data, as shown in FIG. 2(C), showing information on road class as expressway, metropolitan highway, toll road, ordinary road (national road, prefectural road, or the like), and information on a main line or access road (road connecting between the main line and the ordinary road) for the expressway, metropolitan highway, and toll road. The road name data comprises road class data and number within the category, that is individual number data, for the respective road classes.

Next, a system for determining the estimated position of the vehicle in terms of whether the road where the vehicle is traveling now is an expressway (expressway, metropolitan highway, toll road) or other general roads will be described with reference to FIG. 3. In the matching processing between the detection of information on the present position and the road information, conventionally, a candidate road within a predetermined distance from the vehicle present position is selected, the correlation degree with the detected information is calculated for each candidate road and converted into a penalty value making selection of the candidate road difficult, and penalty values of the respective candidate roads are compared to determine the candidate road of the smallest penalty value as the estimated position. The invention is characterized by the addition of estimated position judgment of an upper road (expressway) or a lower road (ordinary road) wherein, for determining the estimated position in a multilayer road, a penalty value, calculated by further performing the upper and lower road determination process, is added to the penalty value of the respective candidate roads determined by a conventional technique. With the addition of such an upper and lower road judgment to the conventional matching processing, the estimated position is determined more accurately, with less influence of the buildings in the periphery, a change of natural condition, or the like.

According to the invention, a vehicle is equipped with a GPS positioning system for obtaining the present position information transmitted by a satellite, means for detecting the vehicle speed pulse corresponding to the vehicle speed, an optical beacon reception unit capable of receiving optical beacon information on an ordinary road, and an electric beacon reception unit capable of receiving electric wave beacon information mainly on an expressway.

Figure 3:
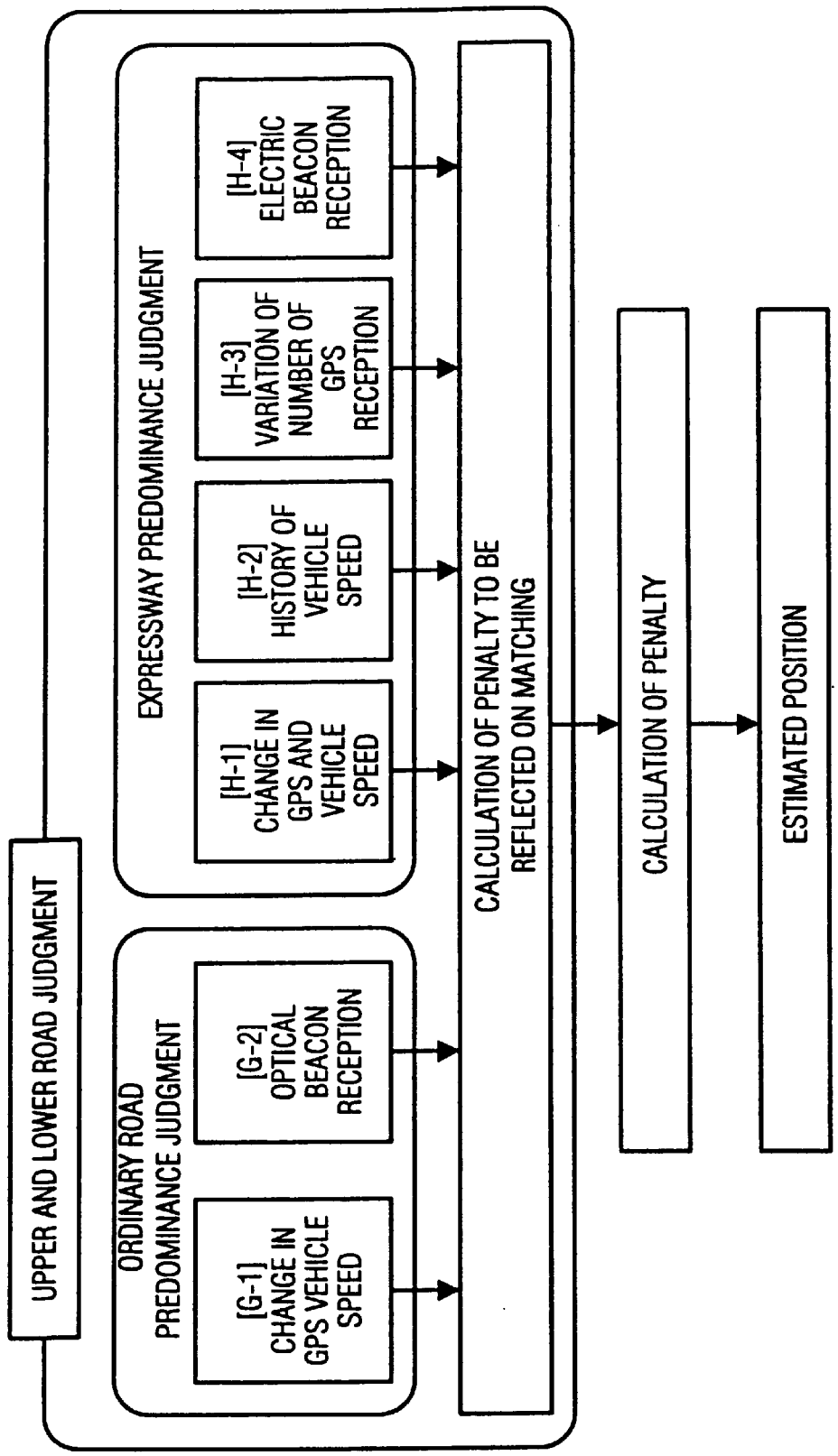
FIG. 3 is a schematic diagram of a system for judging the estimated position of the vehicle present position.

As shown in FIG. 3, the upper and lower road judgment of the invention includes an ordinary road predominance judgment and an expressway predominance judgment, wherein the penalty value to be reflected on the map matching is calculated from the respective judgment results (the detail will be described below). Then, it is determined whether the ordinary road is predominant or the expressway is predominant from the calculated penalty value. The result of the predominant road judgment is then used to determine the estimated position of the present vehicle position and to display the vehicle present position mark on the map.

The judgment of ordinary road predominance is performed by [G-1] GPS and variation of vehicle speed, and [G-2] optical beacon reception conditions. Here, [G-1] is a judgment that the vehicle may have gotten off an expressway and moved to an ordinary road by detecting the GPS and the vehicle speed, while [G-2] is a judgment that a vehicle is on an ordinary road because the optical beacon can be received only on an ordinary road.

The judgment of expressway predominance is performed by [H-1] GPS and variation of vehicle speed, [H-2] history of vehicle speed, [H-3] variation of the number of GPS reception, and [H-4] electric wave beacon reception condition. [H-1] is a judgment that the vehicle may have moved from an ordinary road to an expressway by detecting the GPS and the vehicle speed, [H-2] is a judgment that a vehicle is on an expressway based on the history of vehicle speed showing that a high speed has been sustained, [H-3] is a judgment for detecting the variation of the number of GPS reception and determining that a vehicle is on an expressway because multiple GPS signals can be received easily on the upper road (expressway), and [H-4] is a judgment that a vehicle is on an expressway because an electric wave beacon is received mainly at a high speed.

Figure 4:
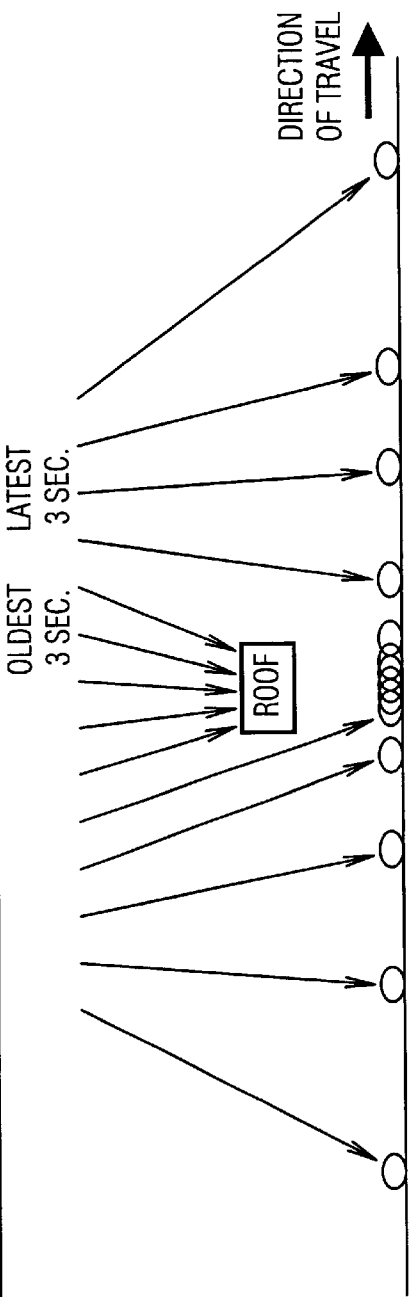
FIG. 4 is a diagram showing the change in GPS and vehicle speed near an expressway access road.

FIG. 4 illustrates GPS near the expressway access road and the variation of vehicle speed. A vehicle passes a toll gate in case of transferring from the ordinary road to the expressway and from the expressway to the ordinary road, but does not pass the toll gate when there is no transfer, as when on the expressway access road. When the vehicle passes a toll gate, the vehicle stops or comes to a similar state, reducing the detected vehicle speed to 0 or near 0. In addition, the roof of the toll gate makes the GPS positioning difficult. FIG. 4 shows an example of taking in data of GPS near the expressway access road and the variation of vehicle speed for using the same for the upper and lower road judgment.

Data is taken in every 1 sec, and the numeral in the highest column "0 to 17" indicates the timing (sec) for taking data in. The numerals in the vehicle speed column indicate the vehicle speed pulse, and the speed reduces from the timing "0 to 6", stops at the timing "7 to 8" and increases at the timing "9 to 17". The row of Δ indicates the variation of vehicle speed (deceleration, stop, acceleration) by arrows. This embodiment includes the channel 1 to 8 of the positioning satellite, and the numerals in the respective channel columns indicate the angle of elevation of the positioning satellite whose electric wave has been received. For instance, at the timing "0", the channel 1 receives the electric wave of a satellite with the angle of elevation 68°. The remaining channels 2–8 and their corresponding angles of elevation in FIG. 4 are: channel 2, 44°; channel 3, 64°; channel 4, 49°; channel 5, 41°; channel 6, 37°; and channels 7, 8 that show that no electric wave was received. Moreover, it can be understood that the reception of electric wave from the positioning satellite becomes difficult in the proximity of the vehicle speed change from deceleration to stop, from stop to acceleration (around timing "5 to 10", under the influence of the roof of the toll gate illustrated schematically in FIG. 4. The gain of the GPS is a value corresponding to the number of channels that have received signals from the GPS satellites, scoring 5 points if one is receiving. For example, six channels are receiving at the timing "0 to 4", 6×5=30, four channels are receiving at the timing 5, 4×5=20, three channels are receiving at the timing 6, 3×5=15, and no channel is receiving at the timing 7 to 10 resulting in a gain of 0. Here, the gain can be weighted by the angle of elevation, because, the bigger the angle of elevation, the more the GPS reflects the effect of the toll gate roof precisely and reliably. For example, the gain can be determined by allocating 5 points to the angle of elevation of 30° to 70°, and 10 points to the angle of elevation of 70° to 90°. If the gain of GPS remains 0, it means that the toll gate roof is preventing the reception of the positioning satellite and, the gain therefore increases once the vehicle departs the toll gate. Therefore, it is possible to judge the passing of a toll gate, namely getting on or off the expressway, as when the gain increases or the vehicle speed changes.

Now, each process flow of the upper and lower road judgment for the multilayer road will be described in detail. Hereinafter, [H-1], [H-2], [H-3] and [H-4] indicate, respectively, GPS and change of vehicle speed, history of the vehicle speed, variation of the number of GPS reception, and electric wave beacon reception, in the expressway predominance judgment. [G-1] and [G-2] indicate, respectively, the change of number of GPS reception, and optical beacon reception in the ordinary road predominance judgement.

Figure 5:
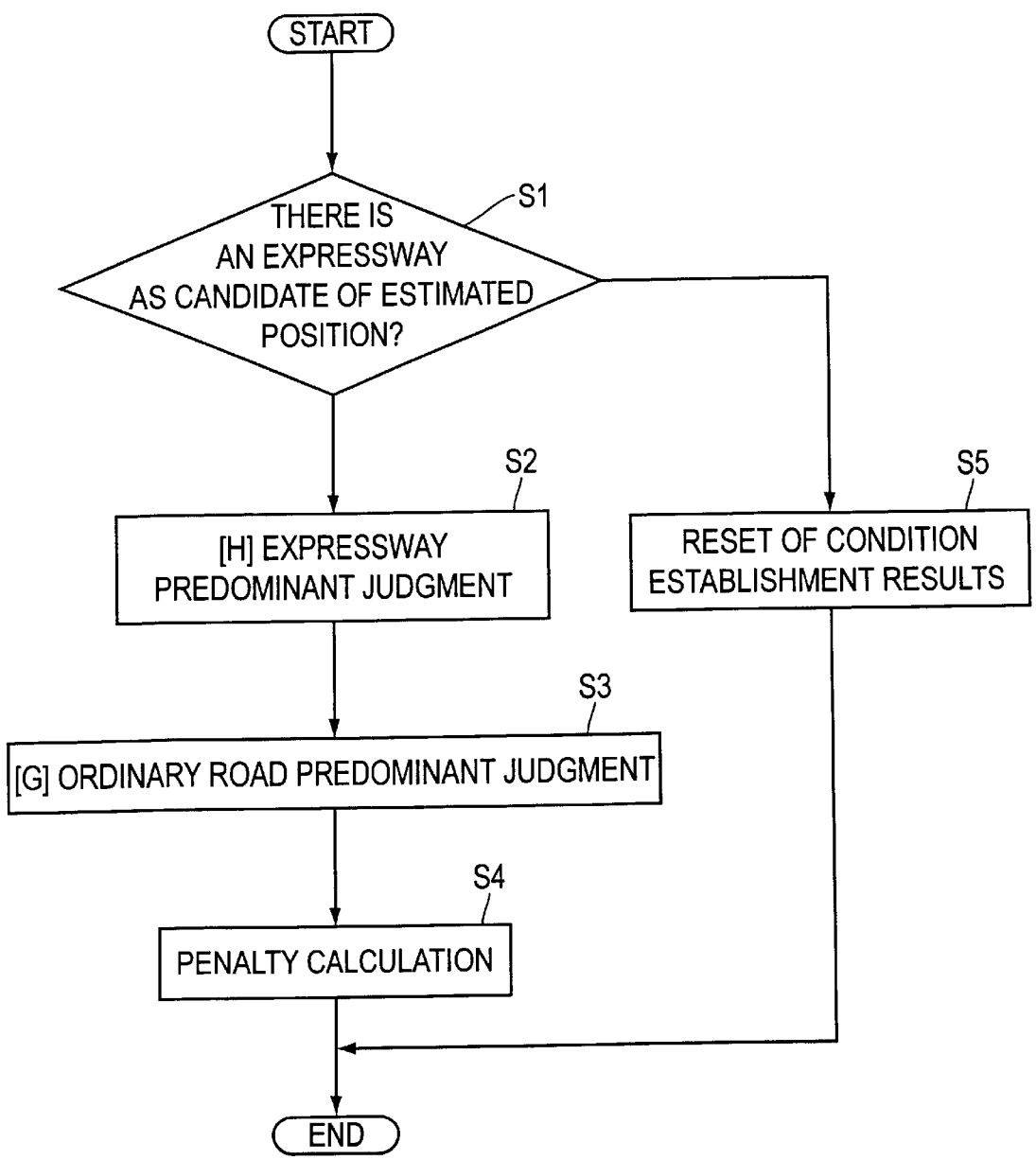
FIG. 5 illustrates the overall processing flow for upper and lower road judgment.

FIG. 5 illustrates the entire processing flow of upper and lower road judgment.

As illustrated in FIG. 5, it is first judged whether there is an expressway within a predetermined distance from the present position of the vehicle that could be a candidate of position for estimating the present position of the vehicle referring to the road data (step S1). For example, if there is an expressway as a candidate of estimated position, such as the vicinity of the access road to the expressway, then an expressway predominant judgment processing and an ordinary road predominant judgment processing mentioned below are performed (steps S2, S3). Next, based on the judgment results of the expressway predominant judgment process (52) and the ordinary road predominant process (53), the penalty value for the respective estimated positions are calculated, as mentioned below (step S4). Then, it is judged whether the vehicle present position is on an upper road or a lower road based on this penalty value. In step S1, if there is no expressway road as a candidate of estimated position, the condition establishment results are reset (step S5). This process resets the flag, if a flag had been set for indicating the establishment or non-establishment of conditions that the expressway is predominant or the ordinary road is predominant or the like, in the previous processing and therebefore.

Figure 6:
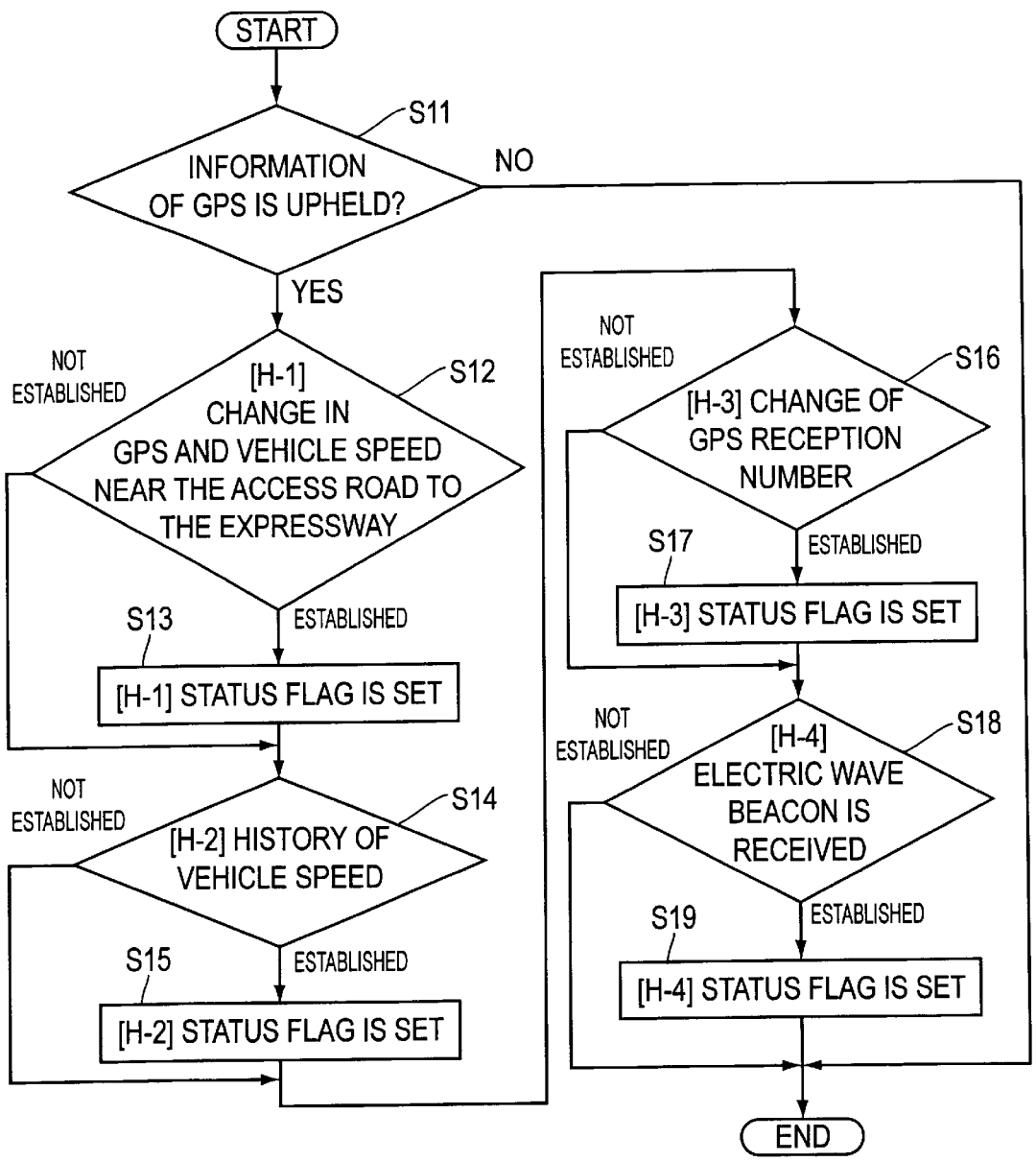
FIG. 6 illustrates an expressway predominant judgment processing flow.

FIG. 6 illustrates an expressway predominant judgment processing flow.

As illustrated in FIG. 6, first it is judged whether the information of GPS is updated or not (step S11). The processing terminates if the GPS information is not updated. If the information of the GPS is updated, then it is judged whether a predetermined condition mentioned below is established or not, for the change in GPS and vehicle speed near the access road to the expressway (step S12). If the condition is established, [H-1] a status flag is set (step S13). In case the condition is not established, the flag is not set. Next, it is judged whether the condition for recognizing a change from the history of the vehicle speed mentioned below is established or not (step S14). If the condition is established, [H-2] a status flag is set (step S15). In case the condition is not established, the flag is not set. Next, it is judged whether the condition for recognizing a change of GPS reception number mentioned below is established or not (step S16). If the condition is established, [H-3] a status flag is set (step S17) and in case the condition is not established, the flag is not set. Next, it is judged whether an electric beacon has been received or not (step S18). If the electric beacon is received, [H-4] a status flag is set (step S19). If the electric beacon is not received, the flag is not set.

Thus, it is judged whether respective conditions of [H-1], [H-2], [H-3], and [H-4] for the expressway predominant judgment have been established, and gain as an overall evaluation is calculated by weighting the respective judgment results as described later.

Figure 7:
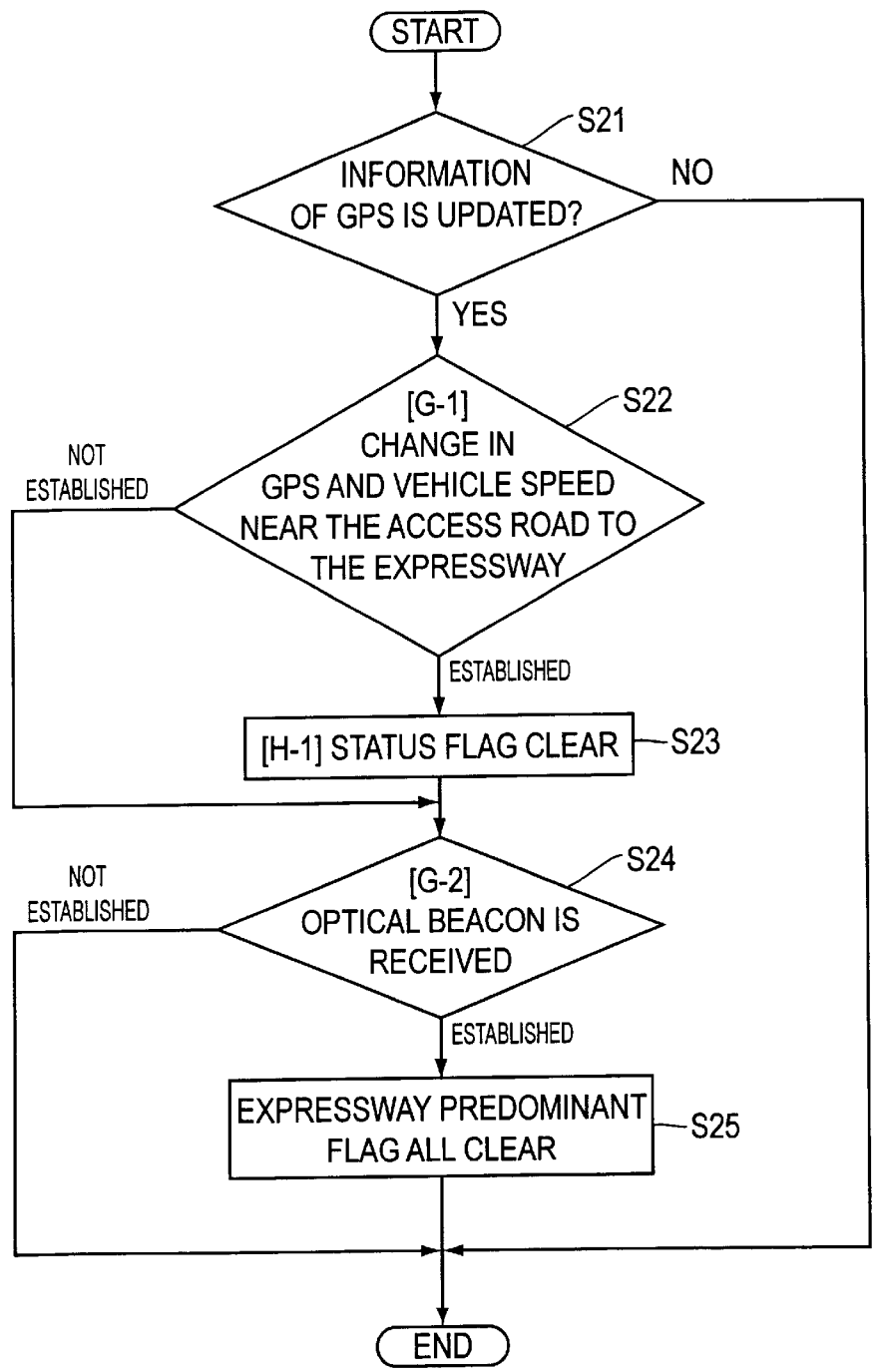
FIG. 7 illustrates an ordinary road predominant judgment processing flow.

FIG. 7 illustrates an ordinary road predominant judgment processing flow.

As illustrated in FIG. 7, first it is judged whether the information of the GPS is updated or not (step S21). The processing terminates if the GPS information is not updated. If the information of the GPS is renewed, it is judged [G-1] whether a predetermined condition mentioned below is established or not, for recognizing a change in GPS and vehicle speed near the access road to the expressway (step S22). If the condition is established, a [H-1] status flag set in the expressway predominant judgment is cleared (step S23). In case this condition is not established, the [H-1] status flag is not cleared. Next, [G-2] it is judged whether an optical beacon has been received or not (step S24). If there was reception of an optical beacon, it is judged that the present position is on the ordinary road, as the optical beacon is installed only on ordinary roads, and all flags set in the expressway predominant judgment are cleared (step S25). In case the optical beacon condition is not established, no flag is cleared.

Figure 8:
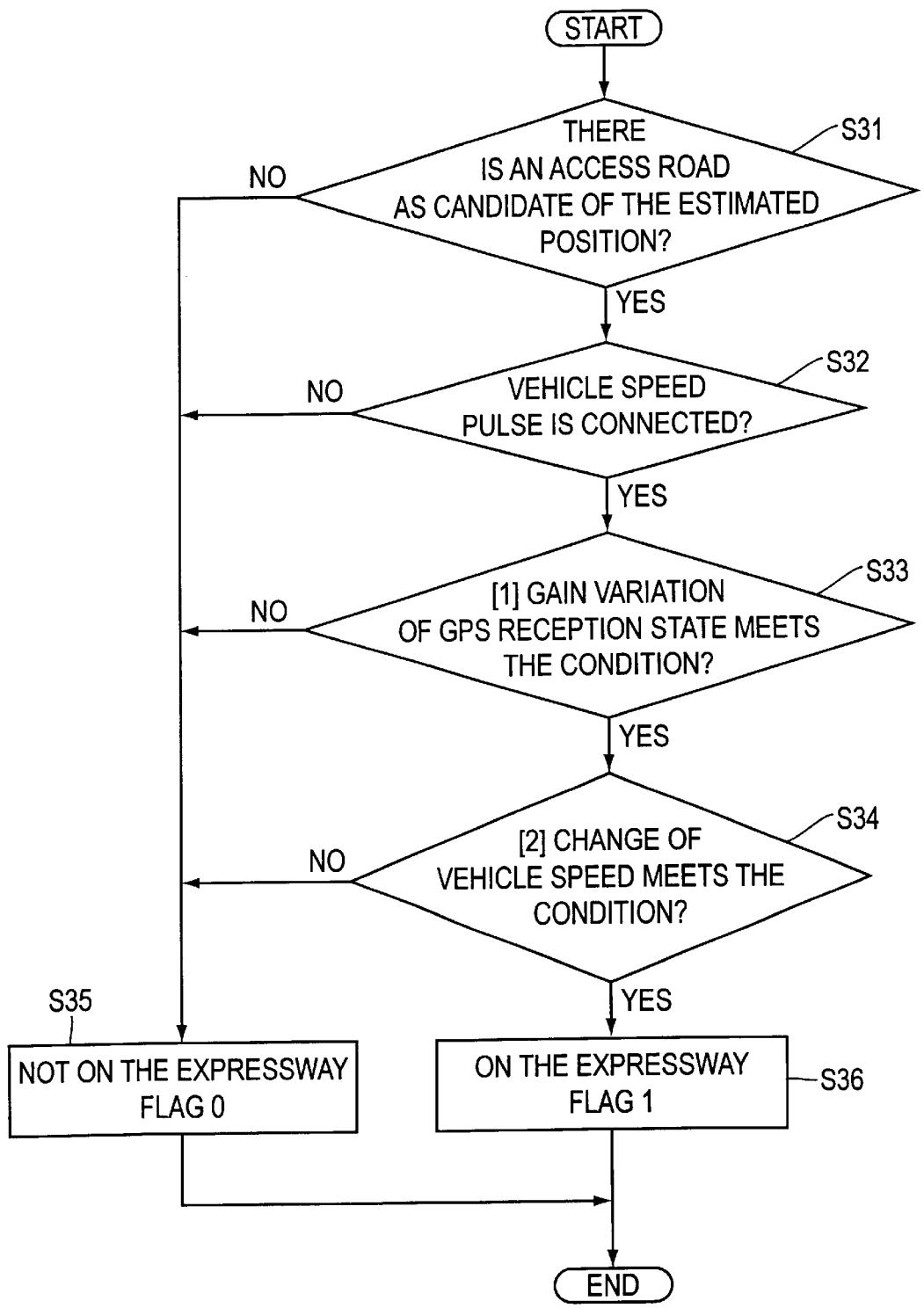
FIG. 8 illustrates a status flag set processing flow for the establishment or non-establishment of the condition for the change in GPS and vehicle speed near the access road to the expressway.

FIG. 8 illustrates a status flag set processing flow for the establishment or non-establishment of the condition based on a change in GPS and vehicle speed near the access road to the expressway.

As illustrated in FIG. 8, it is first judged whether there is an access road or not as a candidate of the estimated position (step S31). If there is an access road available as a candidate of the estimated position in (S31), then it is judged whether the vehicle pulse is connected or not (step S32). The vehicle pulse is for judging whether the vehicle is detecting the vehicle speed. Next, it is judged whether the gain variation of the GPS reception state meets the condition described in the sub-routine of FIG. 9 or not (step S33). If the condition is met, then it is judged whether the change of vehicle speed meets the condition described in the sub-routine of FIG. 10 or not (step S34). Then, in the aforementioned judgment processing, in case any one condition is not established, the status flag is set to 0 supposing that the vehicle is not on the expressway. Alternatively, when all conditions are established, the status flag is set to 1 supposing that the vehicle is on the expressway.

Figure 9:
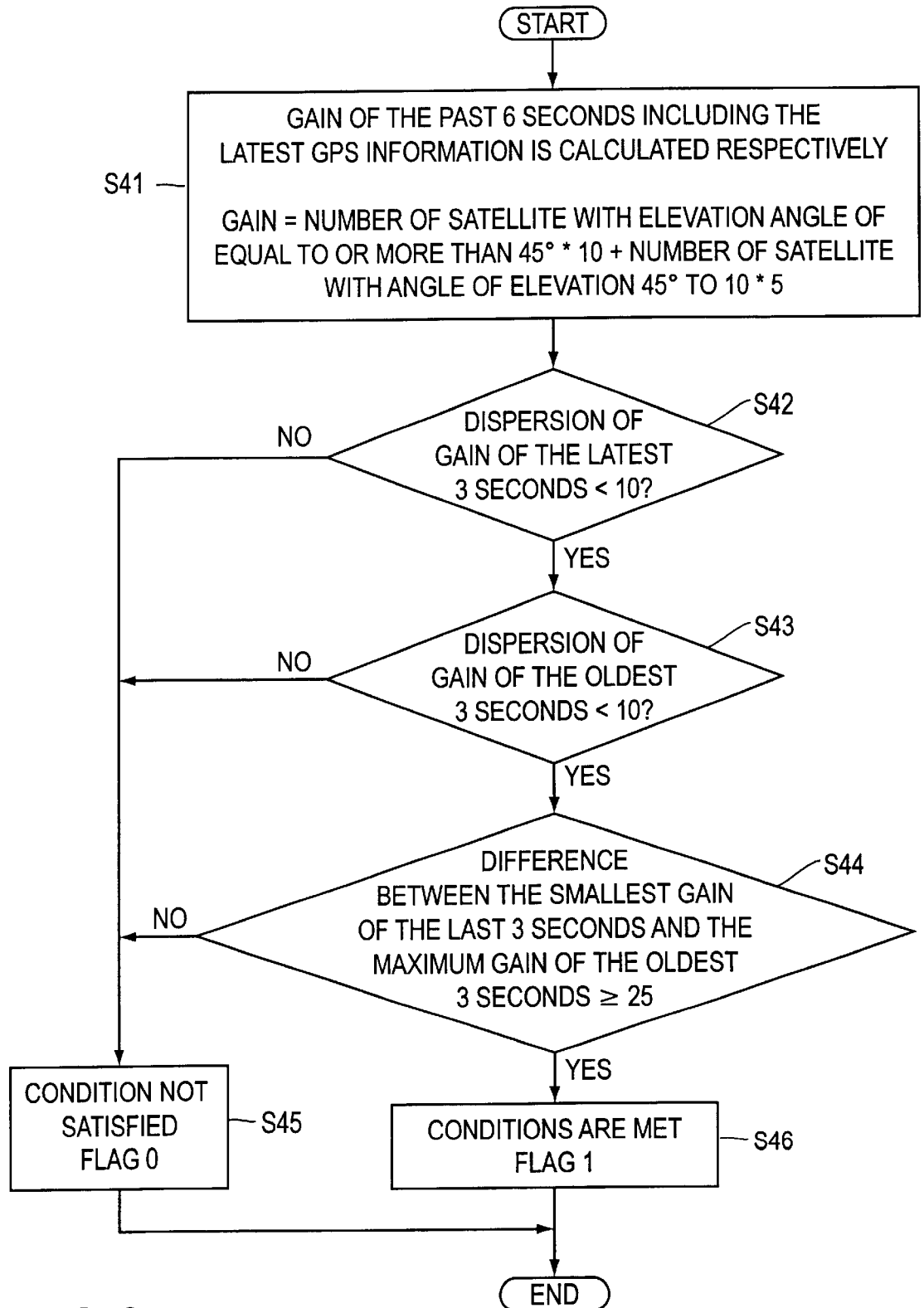
FIG. 9 shows a flag set processing flow of establishment or non-establishment of the condition for the gain variation of GPS reception state.

FIG. 9 shows a flag set processing flow for establishment or non-establishment of the condition of the gain variation of the GPS reception state in step S33 of FIG. 8. In this example, the aforementioned gain is weighted by the angle of elevation, and the angle of elevation 10° to 45° is processed as 5 points, and the angle of elevation 45° to 90° is processed as 10 points.

First, as illustrated in FIG. 9, gain of the past 6 seconds, including the latest GPS information, is calculated (step S41). In this case, the gain is calculated by the following expression:

Gain=(number of satellites with an elevation angle of equal to or more than 45°)×10+(number of satellites with elevation angle of 45° to 10°)×5

Next, it is judged whether the dispersion of gain of the last 3 seconds is less than 10. If the condition is established that the dispersion of gain is less than 10 over the last 3 seconds, then, it is judged whether the dispersion of gain of the oldest 3 seconds during the data acquisition period is less than 10 (steps S42, S43). This is for judging whether the data is reliable or not. In case when the conditions of dispersions less than 10 are established, then it is judged whether the difference between the smallest gain of the last 3 seconds and the maximum gain of the oldest 3 seconds, namely the gain change rate is equal to or more than 25 (step S44). If any one condition in the process of FIG. 9 is not established, then the flag is set to 0 judging that the condition is not established, and in case when all conditions are met, the flag is set to 1 supposing that the conditions are established.

Figure 10:
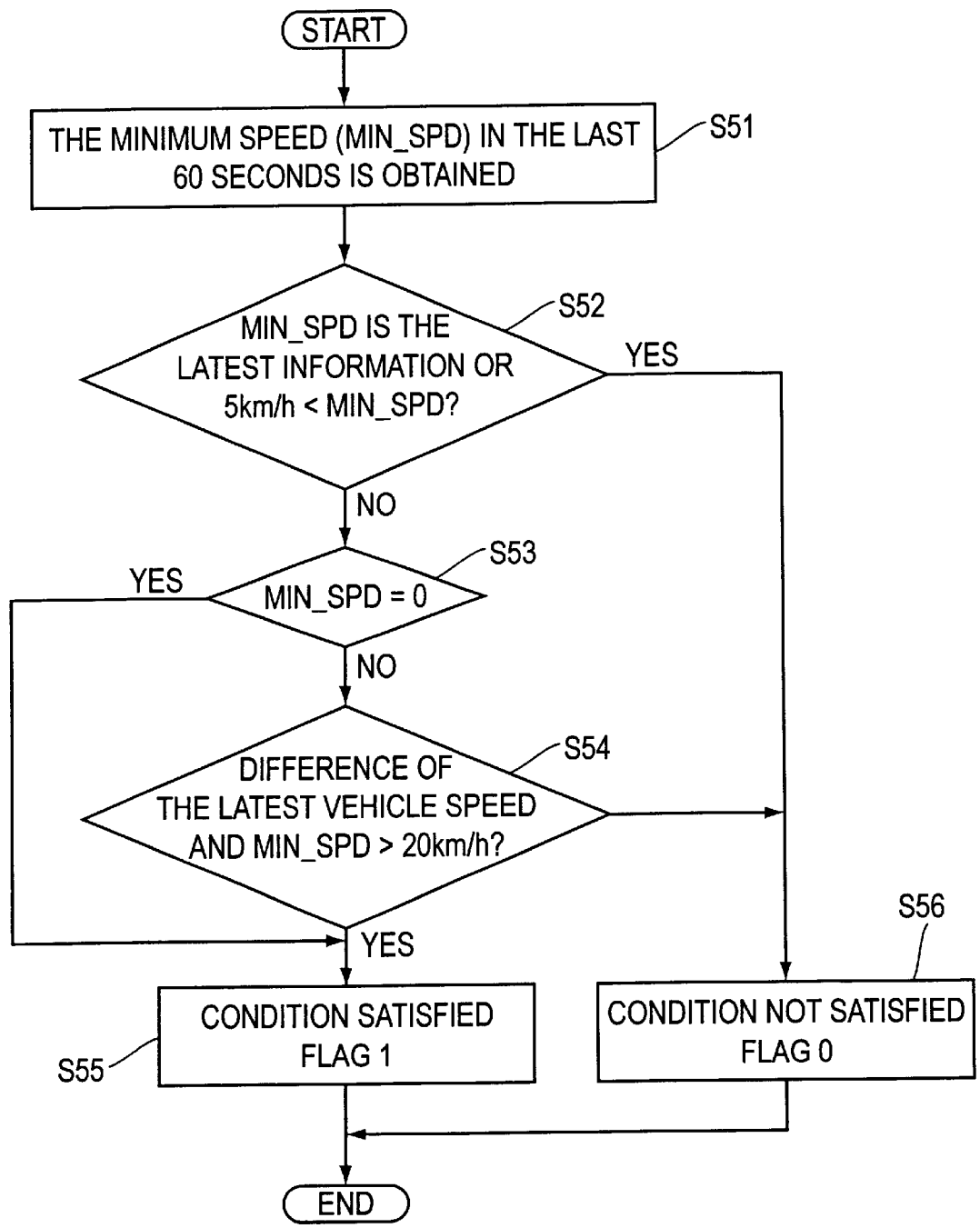
FIG. 10 shows a flag set processing flow of establishment or non-establishment of the condition of the vehicle speed change.

FIG. 10 shows a flag set processing flow of the establishment or non-establishment of the condition for the vehicle speed change in step S34 of FIG. 8.

First, the minimum speed in the last 60 sec is obtained (step S51). Then it is judged whether this minimum speed is the latest information, or is greater than the speed of 5 km/hour. In the case where the minimum speed is not the latest information or is equal to or less than the speed of 5 km/hour, then it is judged whether the minimum speed is 0 or not (step S53). If the minimum speed is not 0, then it is judged whether the difference of the latest vehicle speed and the minimum speed is greater than 20 km/hour (step S54). If the minimum speed is 0 in step S53, or in the case where the difference between the latest vehicle speed and the minimum speed is greater than 20 km/hour in step S54, then the flag is set to 1 supposing that the condition of vehicle change is met. However, in step S52, if the minimum speed is the latest information or is greater than 5 km/hour, then it is judged that the vehicle can not be considered to have stopped, and in step S54, when the difference between the latest vehicle speed and the minimum speed is equal to or less than 20 km/hour, it is similarly judged that the vehicle can not be considered to have stopped. Thus the conditions are not met, and the flag is set to zero (step S56).

Figure 11:
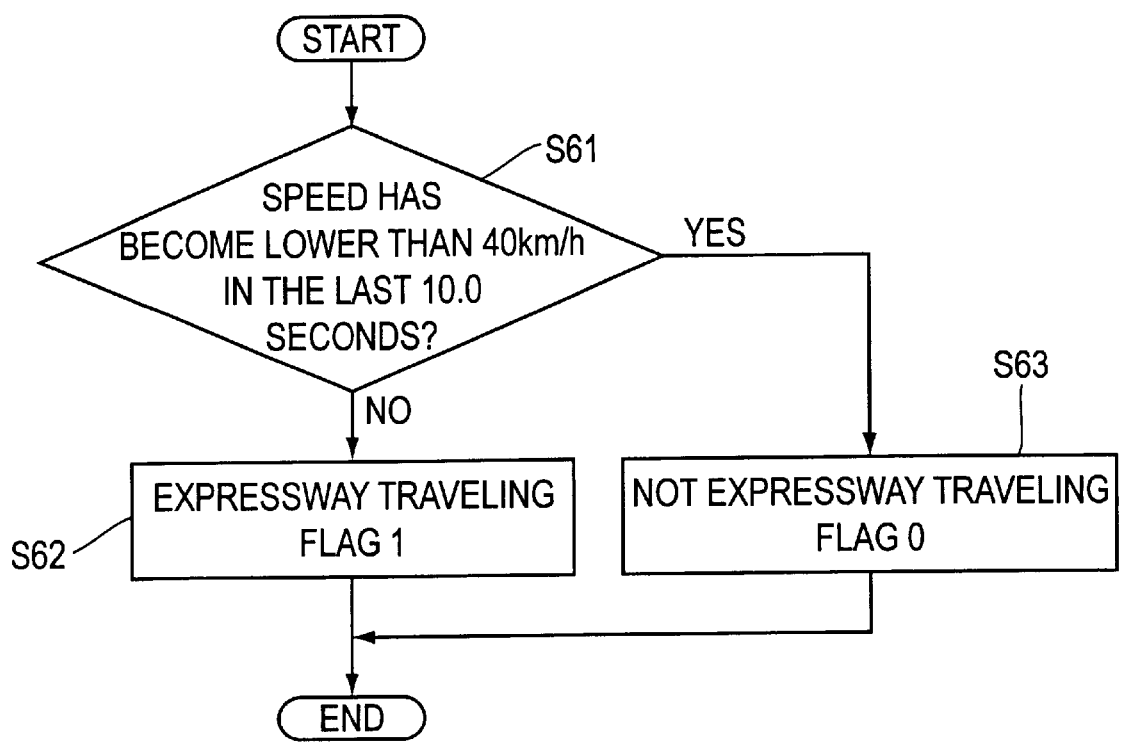
FIG. 11 shows a flag set processing flow in the condition for history of vehicle speed.

FIG. 11 shows the flag set processing flow in [H-2] condition for the history of the vehicle speed.

As illustrated in FIG. 11, it is first judged whether the speed has become less than 40 km/hour in the last 100 sec (step S61). When the speed of the vehicle has never been equal to or less than 40 km/hour, the flag of expressway traveling is set to 1 (step S62). In the case where the vehicle speed has been equal to or less than 40 km/hour, the flag is set to 0 judging that the vehicle is not traveling on the expressway (step S63).

Figure 12:
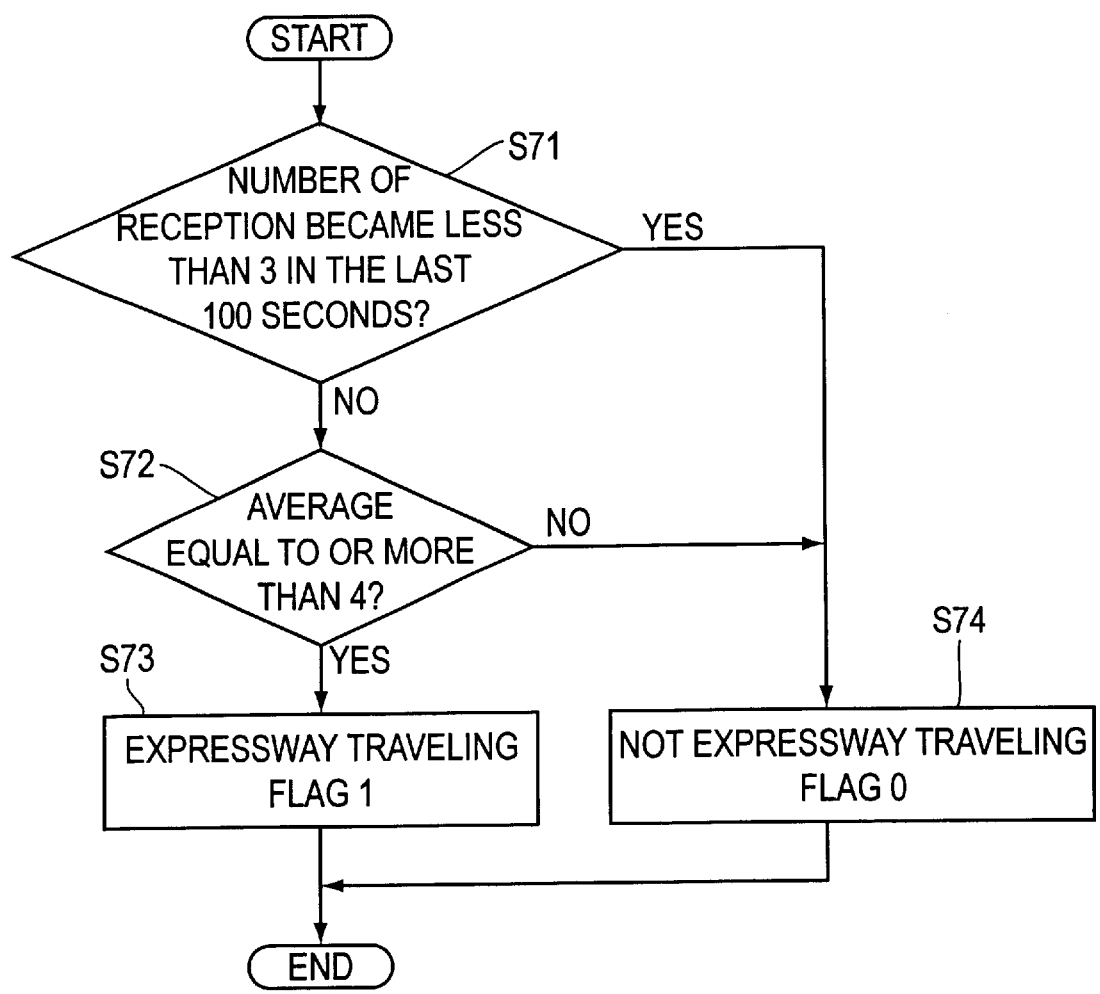
FIG. 12 shows a flag set processing flow in the condition for variation of the number of GPS reception.

FIG. 12 shows the flag set processing flow in [H-3] condition for the change of GPS reception number.

First, in FIG. 12, it is judged whether the number of GPS reception has become less than 3 in the last 100 sec (step S71). When the number of GPS reception has never been less than three, then it is judged whether the average number of GPS reception is equal to or more than 4 (step S72). The flag is set to 1 if the number of GPS reception is equal to or more than 4 in average, judging that the vehicle is traveling on the expressway (step S73) when the average number of GPS reception is at least 4. In the case where the GPS reception number is less than 3 in step S71, and in the case where the GPS reception number is not equal to or more than 4 in average in step S72, the flag is set to 0 judging that the vehicle is not traveling on the expressway (step S74).

Figure 13:
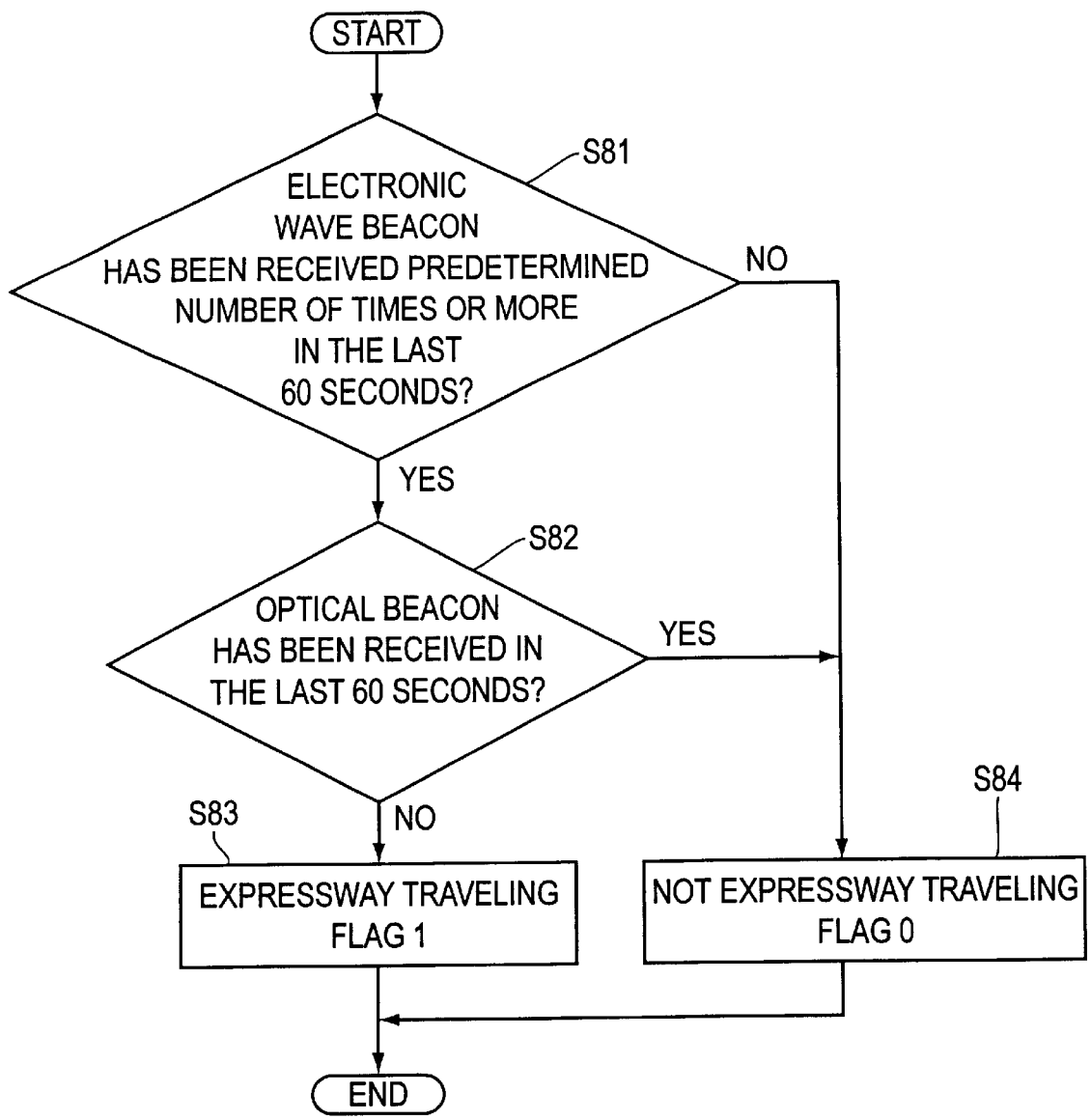
FIG. 13 shows a flag set processing flow in the condition for electric beacon reception.

FIG. 13 shows a flag set processing flow based on the [H-4] condition for electric wave beacon reception.

First, as illustrated in FIG. 13, it is judged whether an electric wave beacon has been received a predetermined number of times or more, for example, two or more in the last 60 sec (step S81). When an electric wave beacon has been received at least the predetermined number of times, then it is judged whether an optical beacon has been received in the last 60 sec or not (step S82). The flag is set to 1 if the optical beam is not received in the last 60 sec., judging that the vehicle is traveling on the expressway (step S83). In the case where the electric wave has not been received two or more times in step S81, or in case where optical beacon has been received in step S82, the flag is set to 0 judging that the vehicle is therefore not traveling on the expressway (step S84).

Figure 14:
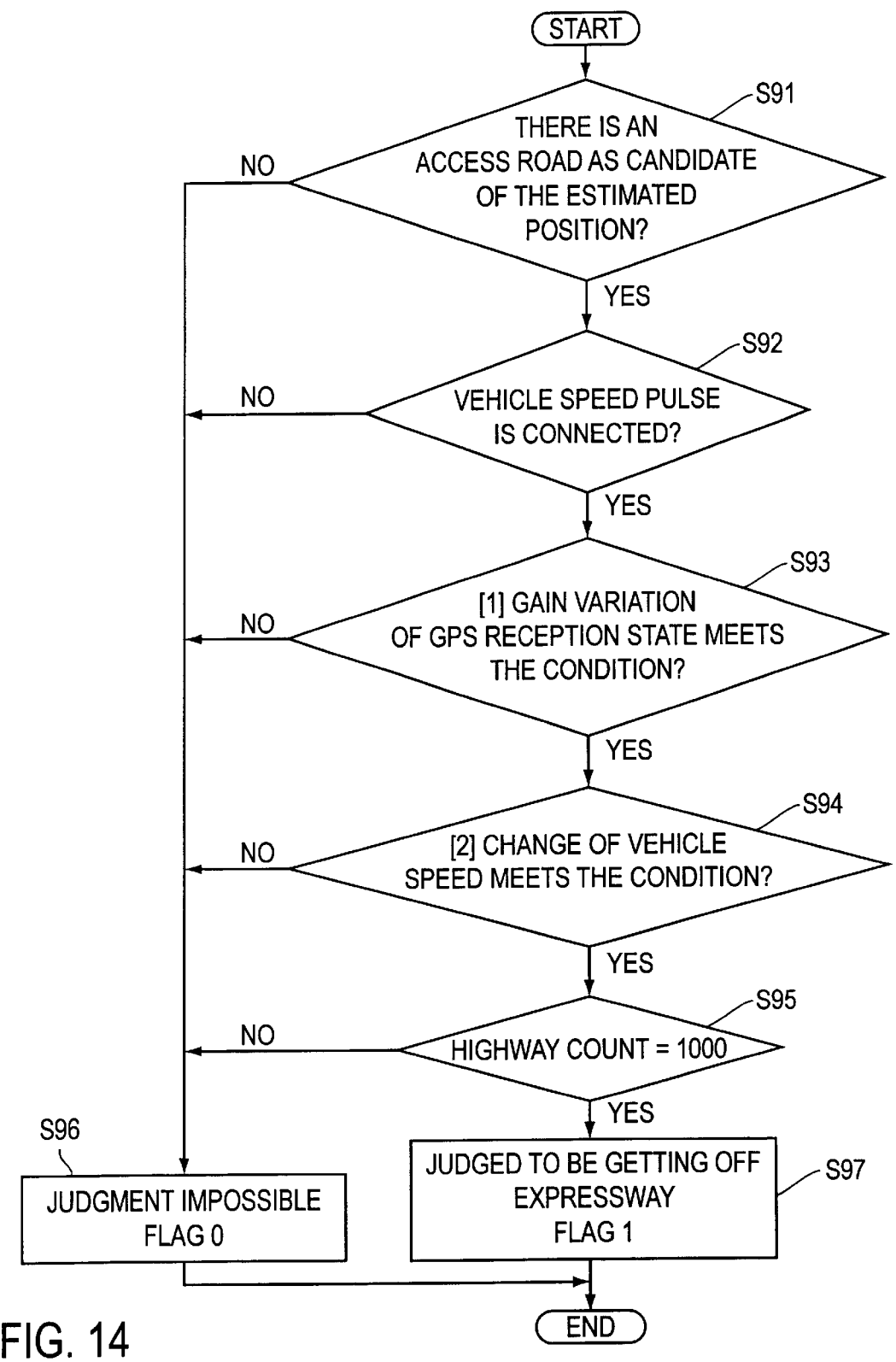
FIG. 14 illustrates a flag set processing flow in the condition for change in the GPS and vehicle speed near the access road to the expressway.

FIG. 14 illustrates a flag set processing flow based on the condition of [G-1] the change in GPS and vehicle speed near the access road to the expressway.

First, in the process illustrated in FIG. 14, it is judged whether there is an access road as a candidate of the estimated position (step S91). If there is an access road available as a candidate of the estimated position, then it is judged whether the vehicle pulse is connected or not (step S92). If the vehicle speed pulse is connected and the vehicle speed is measured, then it is judged whether the gain variation of the GPS reception state shown in FIG. 9 meets the condition or not (step S93). If the condition is met, then it is judged whether the change of vehicle speed shown in FIG. 10 meets the condition set forth in FIG. 10 (step S94). In the case when the respective conditions are satisfied, then it is judged whether the highway count is 1000 or not (step S95).

Highway count can be described as follows: when it is determined whether the vehicle estimated position is an expressway or an ordinary road, the highway counter increments the highway count by 1 in the case of expressway, and decrements by 1 in the case of ordinary road. The highway count is stored by the RAM every second. Therefore, it is determined if the expressway traveling is sustained or not by judging whether the counter content is at the maximum value 1000, or not. Then, in case any one condition is not established, the status flag is set to 0, supposing that the determination cannot be made (step S96). When all the conditions are established, the status flag is set to 1, supposing that the vehicle is getting off the expressway (step S97). This processing is opposite to the processing for getting on the expressway, and is a processing for judging that the vehicle is getting off the expressway, as in the case when the gain of the GPS reception state has changed and the vehicle speed has changed, during the expressway traveling up to that point, by establishment of the highway count conditions. As the method for judging whether expressway traveling is continued or not, in addition to the method of step S95, it may also be judged based on whether the highway count is equal to or more than the upper layer threshold (for example, 800) or not.

Figure 15:
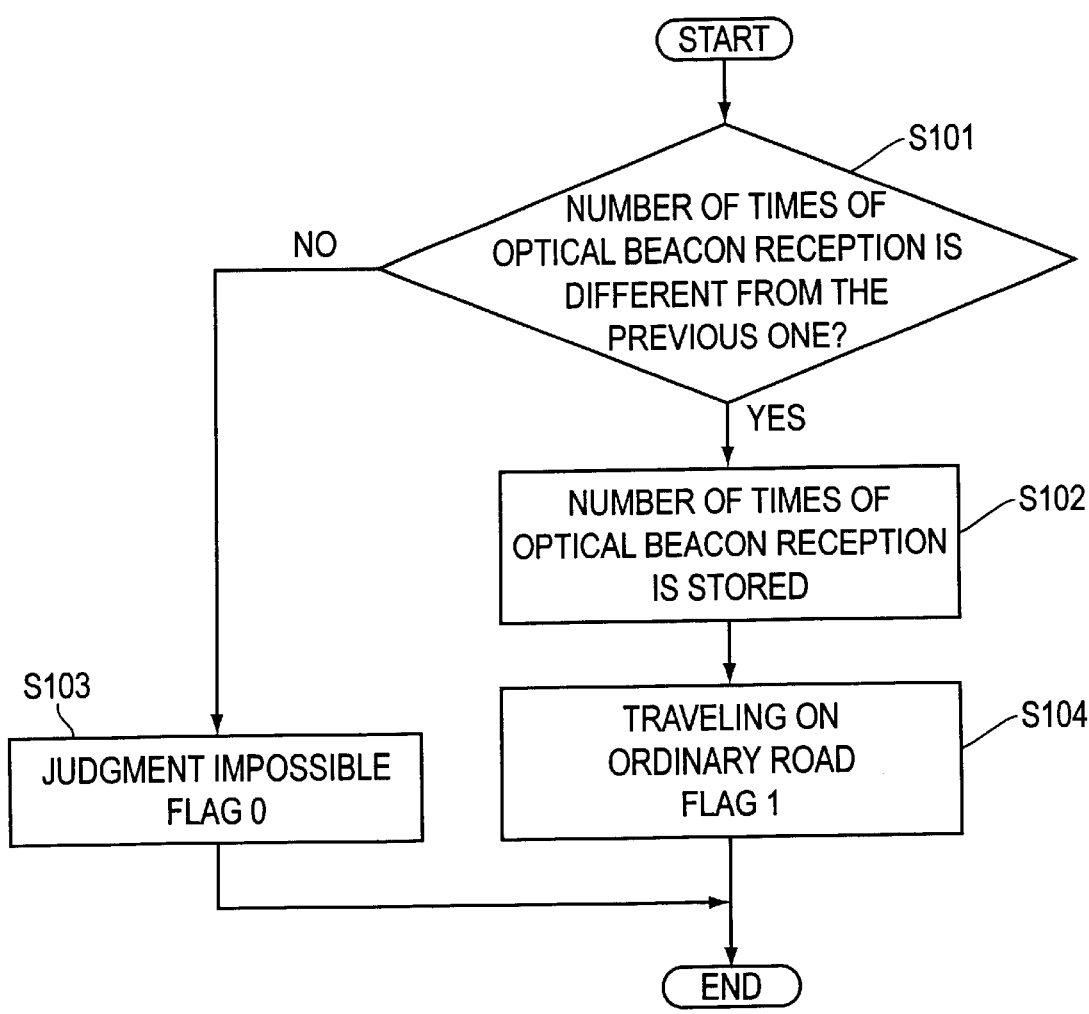
FIG. 15 shows a flag set processing flow in the condition for optical beacon reception.

FIG. 15 shows a flag set processing flow based on the [G-2] condition for optical beacon reception.

As illustrated in FIG. 15, first it is judged whether the number of times of optical beacon reception is different from the previous one (step S101). If the number of optical beacon reception is not different than the previous number, the flag is set to 0, supposing that determination of the road being traveled on cannot be made (step S102). If the number of optical beacon reception is different than the previous number, the number of times of optical beacon reception is stored (step S103), and the flag is set to 1, supposing that the vehicle is traveling on an ordinary road (step S104).

Figure 16:
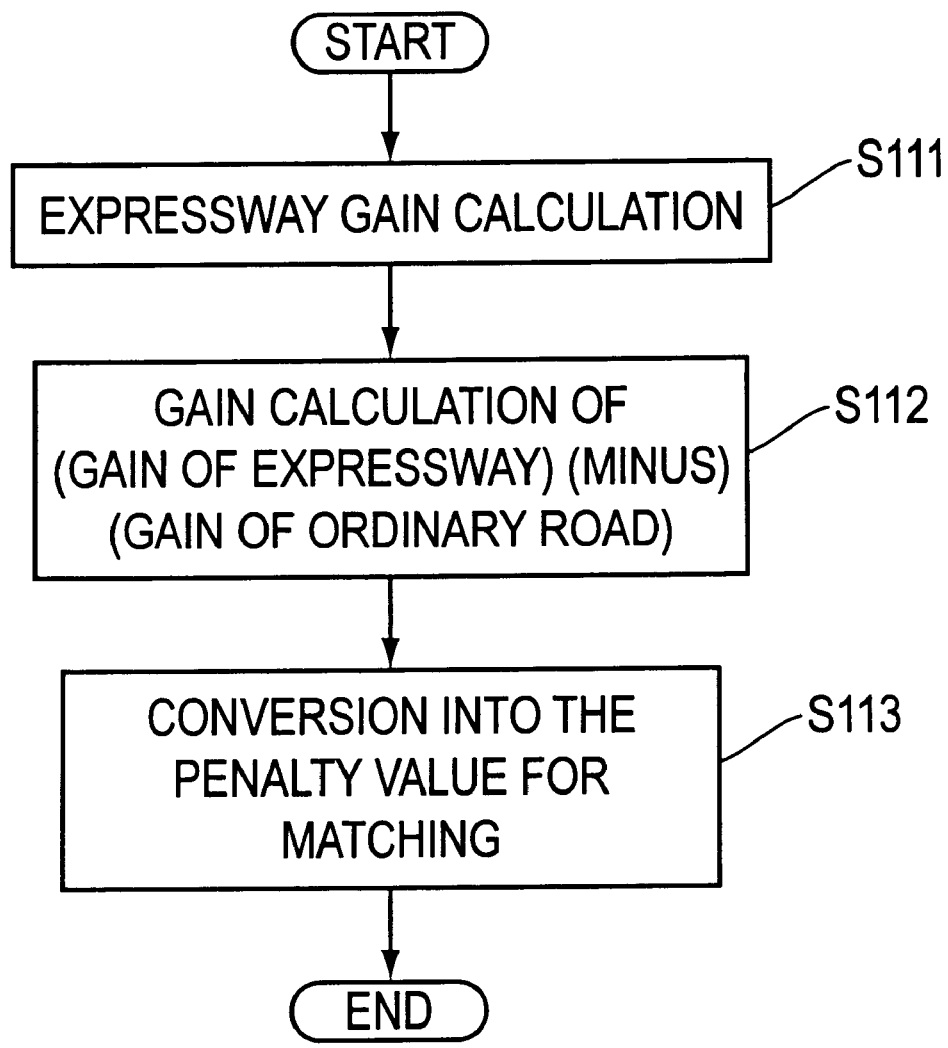
FIG. 16 illustrates a penalty calculation processing flow.

FIG. 16 illustrates a penalty calculation processing flow.

First, the aforementioned expressway gain calculation processing is performed (step S111). Then the difference between the gain of the ordinary road is calculated from the gain of expressway (step S112). Next, the calculated difference of gain is converted into the penalty value for matching (step S113).

FIG. 17(a) shows the gain of an expressway and FIG. 17(b) shows the gain of an ordinary road.

The gain of an expressway is a value obtained by allocating a score for the various conditions. When the respective conditions of [H-1], [H-2], [H-3], and [H-4] are established, weighted and summed. The gain of an ordinary road, on the other hand, is a value obtained by allocating a score for conditions, when the respective conditions of [G-1] and [G-2] are established, weighted and summed. In the example of FIG. 17, the maximum value of gain (sum value of the respective gains) is set to 50, including [H-1] a gain of +20 when the condition for change in GPS and vehicle speed near the access road to the expressway is established, [H-2] a gain of 10 when the condition for history of vehicle speed is established, [H-3] a gain of 10 when the condition for variation of number of GPS reception is established, and [H-4] a gain of 10 when the condition of electric beacon reception is established. On the other hand, the maximum value of gain of the ordinary road is set to 50, including [G-1] a gain of 10 when the condition for change in GPS and vehicle speed near the access road to the expressway is established, and [G-2] a gain of 40 when the condition for optical beacon reception is established. Then, as shown in FIG. 16, the gain for calculating the penalty value for matching is calculated, as (gain of expressway)−(gain of ordinary road).

Now, the formula for converting the penalty value for matching will be described: suppose the gain of [H-1], [H-2], [H-3], and [H-4] is a, b, c, and d respectively, and the gain of [G-1] and [G-2] is e and f where (a+b+c+d=e+f=50).

The formula for converting the penalty value for matching can be expressed as follows:

$$\{(a+b+c+d)-(e+f)\}/50 \times 100 = \text{penalty value}(\alpha)$$

Consequently, the maximum value of penalty value is 100 if (a+b+c+d)=50 and if (e+f)=0.

Figure 18:
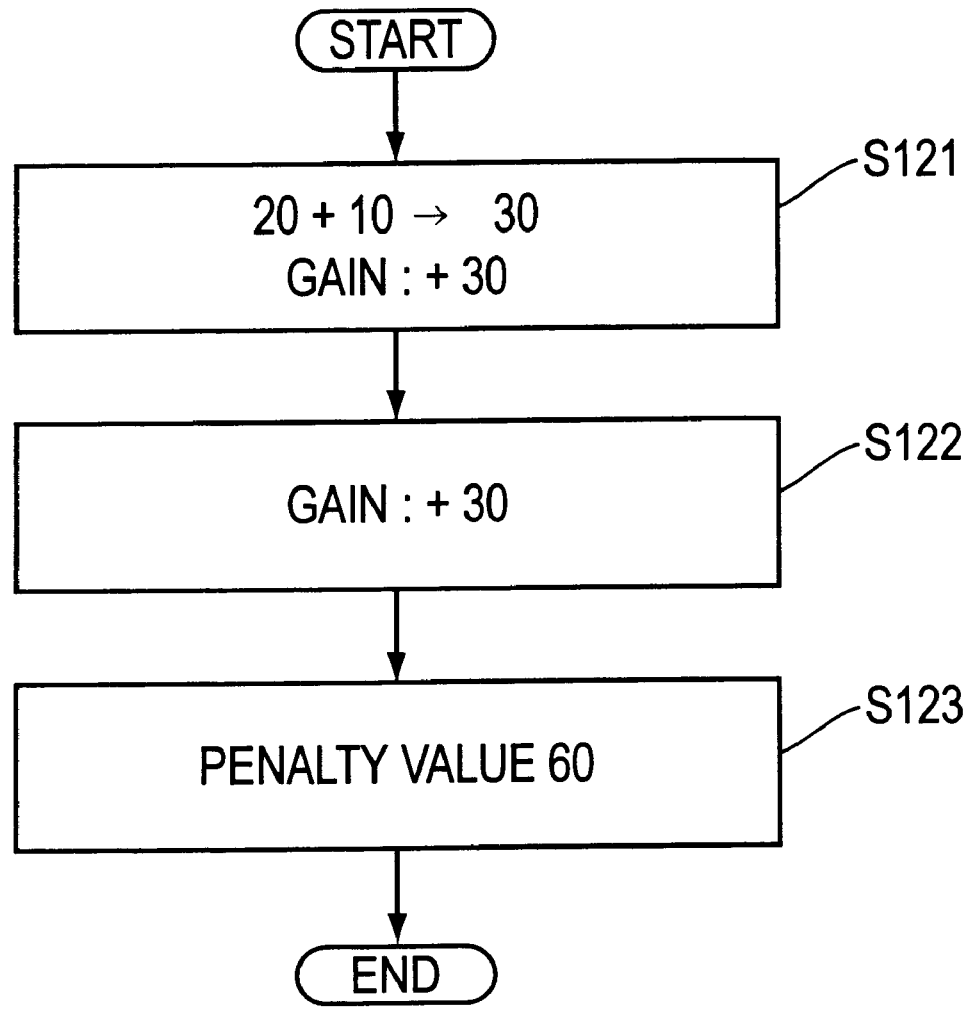
FIG. 18 illustrates a processing flow of an example of penalty calculation.

Next, an example wherein conditions [H-1] and [H-2] are established will be described with reference to FIG. 18.

As the gains of [H-1] and [H-2] are 20 and 10 respectively from the gain table, the gain of expressway is 20+10=30 (step S121). The difference of gain between the expressway and the gain of an ordinary road is 30 (step S122). From the formula for converting the penalty value for matching:

$$(30/50) \times 100 = 60$$

Therefore, the penalty value is 60 (step S123). This penalty value 60 is added as the penalty of the upper and lower road judgment, to the penalty value of the ordinary road in the conventional penalty processing. On the contrary, if conditions of [G-1] and [G-2] are established and the penalty value is obtained, the absolute value of this value is added to the penalty value of the expressway in the conventional penalty processing.

Figure 19:
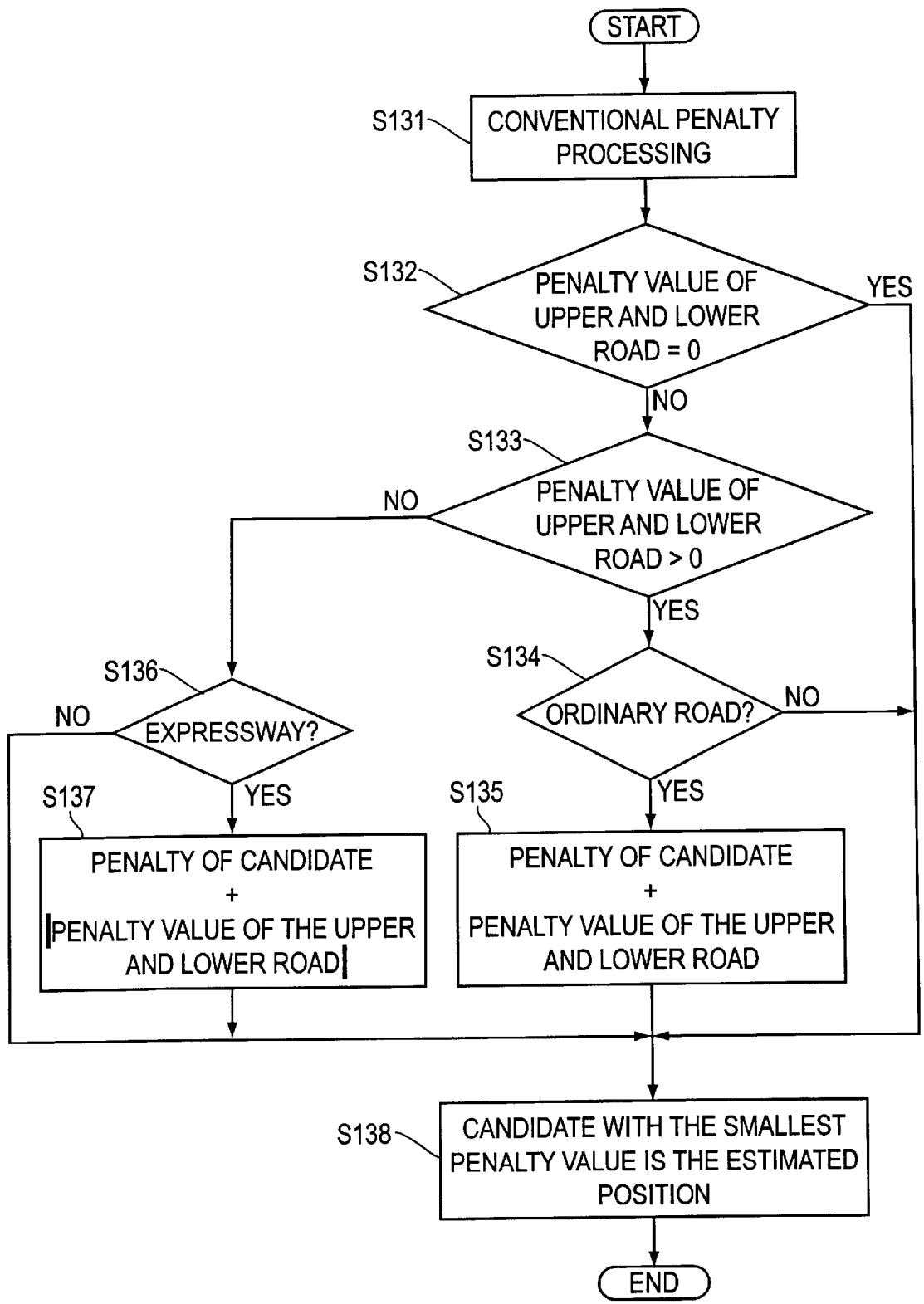
FIG. 19 shows a penalty calculation processing flow.

FIG. 19 shows the penalty calculation processing flow. First, the conventional penalty processing is performed (step S131). Here, the penalty value of each candidate road is calculated from the correlation of the present spot detection information with the candidate road at the estimated position. Next, it is judged whether the penalty value of the upper and lower roads according to the invention is 0 or not (step S132). If the penalty value is 0, then the smallest candidate of penalty values determined in step S131 becomes the estimated position (step S138). If the penalty value of the upper and lower road is not 0, then it is judged whether this penalty value is positive or not (step S133). If the penalty value is positive (expressway predominance judgment), then it is judged whether the candidate road is an ordinary road or not (step S134). If the road is determined to be an ordinary road, then the calculated penalty value of the upper and lower roads is added to the penalty value of the candidate. If the road is not an ordinary road in step S134, then the addition processing is not performed. In step S133, if the penalty value is negative (ordinary predominance judgment), then it is judged whether the candidate road is an expressway or not (step S136). If the candidate road is on expressway, then the absolute value of the calculated penalty value of the upper and lower road is added to the penalty value of the candidate road (step S137). If the candidate road is not an expressway, then the addition is not performed. The candidate road with smallest penalty values thus determined is determined as the estimated position (step S138).

Figure 20:
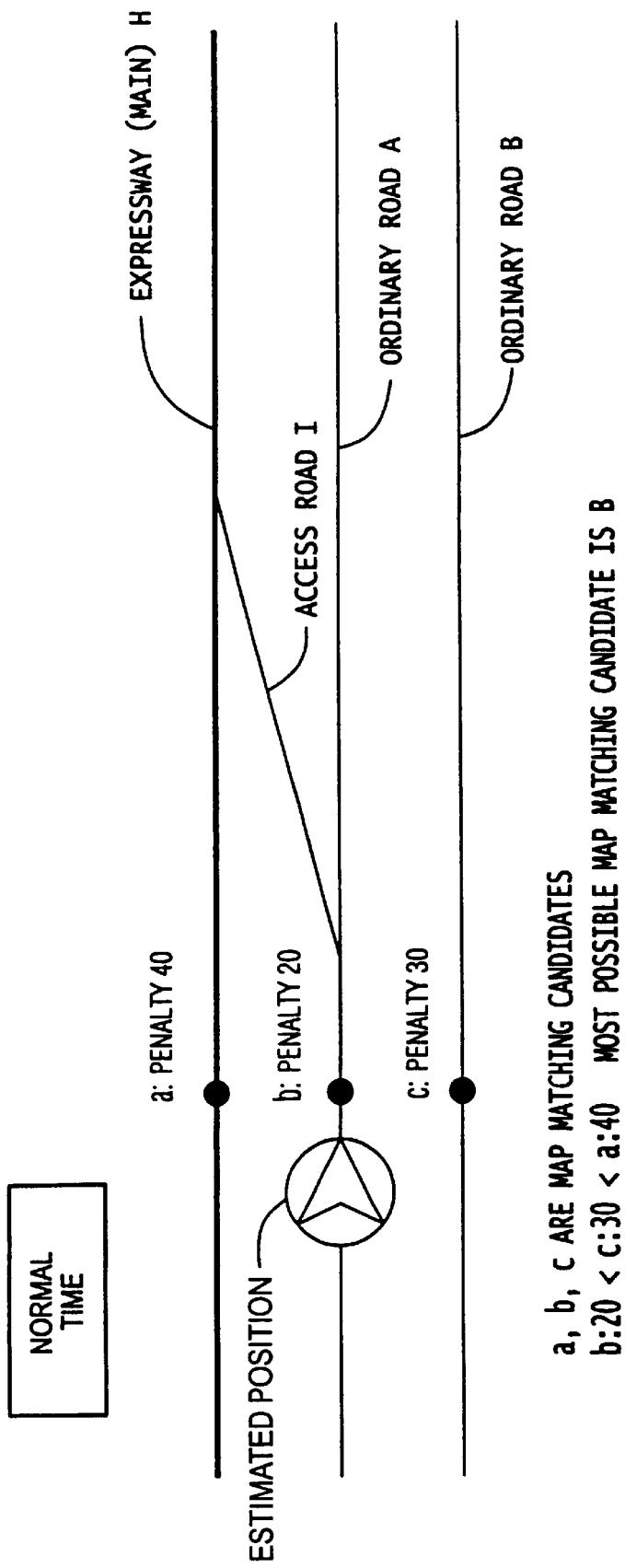
FIG. 20 illustrates a matching processing in a normal case.
Figure 21:
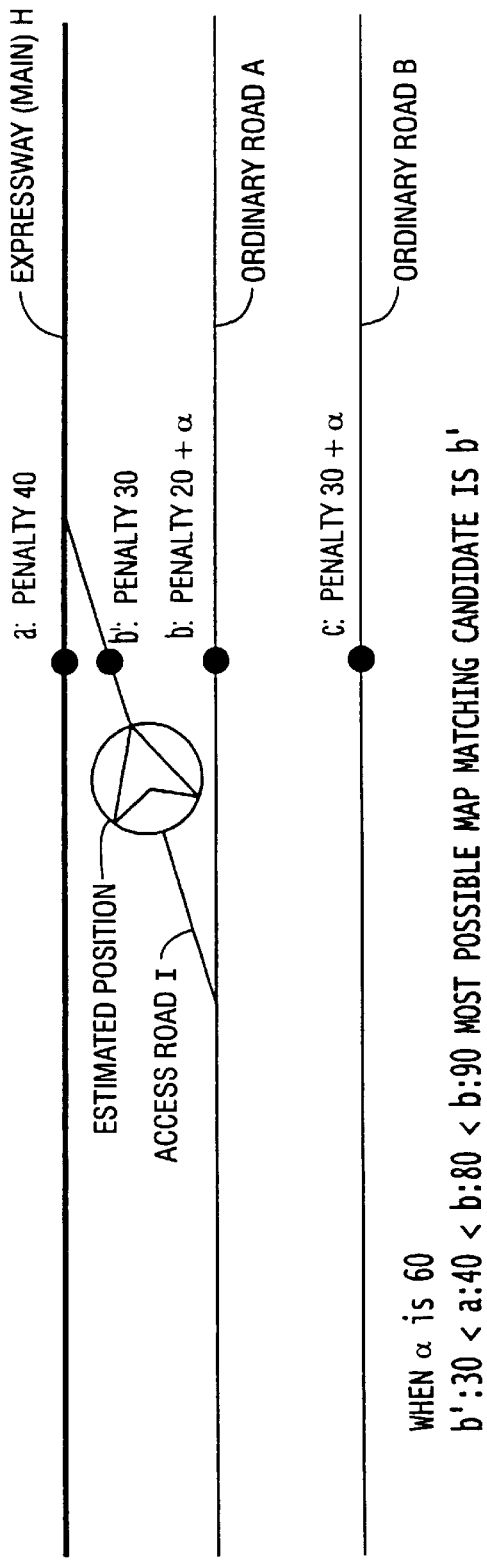
FIG. 21 illustrates an example in which upper and lower road judgment is added to the matching processing in a normal case.

Now, the concept of reflection of the penalty value of the upper and lower road judgment on the map matching is described by FIGS. 20 and 21.

FIG. 20 illustrates a matching processing in the normal case (without upper and lower road judgment).

FIG. 20 shows the case where the present spot is on an ordinary road A, and there is an expressway (main line) H and an ordinary road B as candidates of the other estimated positions, and an access road I in the vicinity. In the conventional method without upper and lower road judgment, supposing that the penalties a, b, and c of the expressway H, ordinary road A and ordinary road B determined from the correlation of the present spot detection information with the candidate road at the estimated position are 40, 20, 30, respectively, since b:20<c:30<a:40, the most possible candidate for the map matching results to be the ordinary road A of the penalty b, that will be determined as the estimated position.

FIG. 21 illustrates a processing in which the penalty of upper and lower roads is reflected on the matching processing of FIG. 20.

As shown in FIG. 20, it is supposed that penalties a, b, and c of the expressway H, ordinary road A and ordinary road B as candidate roads are 40, 20, and 30, respectively, and that a penalty b' of the access road I is 30. Supposing that a penalty value α obtained by the upper and lower road judgement is positive (expressway predominance judgment), then α is added to the penalties b and c of the ordinary roads A and B. Herein, for example, when α is 60, the penalty b' of the access road is the smallest as b':30<a:40<b:80<b:90. The most possible candidate for the map matching results on this basis then is the access road I with the penalty b', which is thus determined as the estimated position.

The present invention is not limited to the aforementioned embodiments, but also includes various modifications. For instance, in FIG. 8 of the aforementioned embodiment, although it is judged that the vehicle has gotten onto the expressway when the gain variation of the GPS reception state satisfies the designated condition, and further, when the variation of vehicle speed satisfies the designated condition in another embodiment, it may be judged that the vehicle has gotten onto the expressway when, in addition to the aforementioned conditions, the highway counter is equal to or more than a predetermined value, or the like. The processing (flag setting processing) in step S36 of FIG. 8 is considered performed whenever the vehicle has passed the toll gate (when the vehicle gets on and off the expressway). Consequently, using the highway counter, it can be judged that the vehicle has gotten onto the expressway when the past estimated position is an ordinary road and the vehicle has passed the toll gate. Further, it may be judged that the vehicle has gotten off the expressway, if the past estimated position is an expressway and the vehicle has passed the toll gate.

In addition, in FIG. 12, whether traveling on an expressway or not is judged by determining if the average of the GPS reception in the past section is equal to or more than 4.

As another embodiment, however, it may be judged to be an upper layer when the gain (score) of the GPS in the past section (distance or time) is greater than the upper layer threshold, by weighting the angle of elevation of the GPS as shown in FIG. 4. Likewise, the estimated position may be determined to be a lower layer if the GPS gain in the past section is smaller than the lower layer threshold. Here, the upper layer threshold and the lower layer threshold may be of the same value, or a different value. This processing allows one to perform the upper and lower judgment more accurately than the case in which a road is judged as upper layer when the average of the number of the GPS reception is greater than a predetermined value or the case in which a road is judged as an upper layer when a GPS greater than a predetermined angle is received.

Although in the aforementioned embodiment, the judgment of expressway includes four judgments, it does not necessarily have to be four. In addition, in case of judgment condition for performing the expressway predominance judgment, other judgment conditions may also be added. The same concept applies to the ordinary road predominance judgment, and it does not necessarily be composed of two judgments. It has been described that a score is allocated in the angle of elevation GPS or expressway predominance judgment, or ordinary road predominance judgment, for performing the upper and lower road judgment of a multilayer road based on the sum thereof. However, it goes without saying that it can be applied to various things provided that they can be ranked (comparison coefficient).

As mentioned above, according to the present invention, the passage of a vehicle through a toll gate can be judged accurately, because the passage of the vehicle through the toll gate is judged based on the positioning satellite information and the vehicle speed information. In addition, the judgment accuracy can be improved over a method in which judgment is made by a single judgment condition because the comparison coefficient is allocated to a plurality of judgment conditions and the sum thereof is reflected on the upper and lower road judgment of the multilayer road. In addition, the vehicle estimated position can be judged more accurately than the case where a GPS signal greater than a predetermined angle is received, because the comparison coefficient is allocated to the received satellite signal based on the angle of elevation, the sum of comparison coefficients is calculated, and the vehicle estimated position is determined based on the sum thereof. Further, the accuracy of the estimated position in the multilayer road can be improved by using conditions appropriate for the respective road attributes, such as judging that the expressway is predominant as an estimated position if conditions particular to the expressway are satisfied, and judging that the ordinary road is predominant as an estimated position if conditions particular to the ordinary road are satisfied.

What is claimed is:

1. A car-navigation system for determining an estimated position of a vehicle, comprising:
   reception means for receiving positioning satellite information, wherein the positioning satellite information comprises at least one electric wave from a plurality of positioning satellites;
   vehicle speed detection means for detecting the speed of a vehicle;
   at least one storage means for storing the received positioning satellite information and detected vehicle speed information;
   calculation means for calculating a variation in the number of electric waves received from the plurality of positioning satellites; and
   estimated position determination means for determining the estimated position of a vehicle;
   wherein the estimated position determination means judges whether the vehicle has passed a tollgate based on the variation in the number of electric waves received from the plurality of positioning satellites calculated by the calculation means and the vehicle speed information stored in the storage means.

2. The car-navigation system according to claim 1, wherein the calculation means calculates the variation in the number of electric waves received from the plurality of positioning satellites and the variation in the amount of vehicle speed, and the estimated position determination means judges whether the vehicle has passed the toll gate by determining the estimated position of the vehicle based on the calculated variation in the number of electric waves received from the plurality of positioning satellites and the calculated variation in the amount of vehicle speed.

3. The car-navigation system according to claim 1, wherein the storage means further stores at least one past estimated position of the vehicle and the estimated position determination means judges that the vehicle has gotten off an expressway, when a stored past estimated position is an expressway and the present estimated position is determined as having passed a tollgate.

4. The car-navigation system according to claim 1, wherein the storage means further stores at least one past estimated position of the vehicle and the estimated position determination means judges that the vehicle has gotten onto an expressway, when a stored past estimated position is an ordinary road and the present estimated position is determined as having passed a tollgate.

5. A car-navigation system for estimating whether a vehicle travels an upper or lower road of a multilayer road, comprising:
   means for allocating comparison coefficients to a plurality of judgment conditions; and
   means for estimating whether a vehicle travels on the upper or lower road of a multilayer road based on a sum of comparison coefficients, wherein at least one of the plurality of judgment conditions relates to a positioning satellite.

6. A car-navigation system for estimating whether a vehicle travels an upper or lower road of a multilayer road, comprising;
   means for allocating comparison coefficients to a plurality of judgment conditions; and
   means for estimating whether a vehicle travels on the upper or lower road of a multilayer road based on a stun of comparison coefficients, wherein at least one of the plurality of judgment conditions relates to a history of vehicle speed.

7. A car-navigation system for determining the estimated position of a vehicle, comprising:
   reception means for receiving at least one electric wave from a plurality of positioning satellites; and
   control means for allocating comparison coefficients based on an angle of elevation to the received satellite, and judging the estimated position of a vehicle based on a sum of the comparison coefficients.

8. A car-navigation system for determining an estimated position of a vehicle, comprising:
   a first judgment means for judging expressway predominant as the estimated position;

a second judgment means for judging ordinary road predominant as the estimated position; and control means for determining the vehicle estimated position based on the judgment results of the first and second judgment means.

9. The car-navigation system according to claim 8, wherein the control means calculates a penalty value based on the judgment results of the first and second judgment means, and determines the vehicle estimated position by adding the calculated penalty value to the penalty value of a candidate road.

10. The car-navigation system according to claim 9, wherein the first judgment means comprises a plurality of judgment means; and the control means calculates a total coefficient from comparison coefficients allocated to the plurality of judgment means, and calculates the penalty value from the total coefficient.

11. The car-navigation system according to claim 9, wherein the second judgment means comprises a plurality of judgment means; and the control means calculates a total coefficient from comparison coefficients allocated to the plurality of judgment means, and calculates the penalty value from the total coefficient.

12. A storage medium having a built-in program for determining an estimated position of a vehicle, comprising:

a first judgment for judging expressway predominant as the estimated position;

a second judgment for judging ordinary road predominant as the estimated position; and a built-in program for determining the vehicle estimated position based on the judgment results of the first and second judgments.

* * * * *